(12) United States Patent
Warrick et al.

(10) Patent No.: US 11,770,575 B2
(45) Date of Patent: *Sep. 26, 2023

(54) ALLOWING MOBILE DEVICE TO REMOTELY CONTROL AUTHORIZED SUBSET OF CONTROLLABLE DEVICES UTILIZING CONTENT AVAILABLE IN REGISTERED GUEST ROOM

(71) Applicant: Guest Tek Interactive Entertainment Ltd., Calgary (CA)

(72) Inventors: Peter S. Warrick, Calgary (CA); Brendan G. Cassidy, Calgary (CA); Brian W. King, Calgary (CA); Lea Lorenzo, Calgary (CA); Blake Read, Calgary (CA); Ian S. McBeth, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,993

(22) Filed: Feb. 8, 2022

(65) Prior Publication Data

US 2022/0167041 A1 May 26, 2022

Related U.S. Application Data

(63) Continuation of application No. 16/671,557, filed on Nov. 1, 2019, now Pat. No. 11,272,239, which is a
(Continued)

(30) Foreign Application Priority Data

Jun. 7, 2010 (CA) .................................. CA 2709651

(51) Int. Cl.
*H04N 21/214* (2011.01)
*H04N 21/258* (2011.01)
(Continued)

(52) U.S. Cl.
CPC ..... *H04N 21/42206* (2013.01); *G06F 21/305* (2013.01); *G06F 21/6236* (2013.01);
(Continued)

(58) Field of Classification Search
None
See application file for complete search history.

(56) References Cited

U.S. PATENT DOCUMENTS

| | | | | |
|---|---|---|---|---|
| 2003/0048757 | A1* | 3/2003 | Accarie | H04L 61/00 370/257 |
| 2003/0080874 | A1* | 5/2003 | Yumoto | H04M 1/72415 340/13.23 |

(Continued)

*Primary Examiner* — Brian T Pendleton
*Assistant Examiner* — Jean D Saint Cyr
(74) *Attorney, Agent, or Firm* — ATMAC Patent Services Ltd.; Andrew T. MacMillan

(57) ABSTRACT

A mobile device is configurable by a controller to remotely operate a target controllable device, the controller and the target controllable device being part of a hospitality media system. A communication module establishes a connection to the controller and performs data transfer between the mobile device and the controller. A customization module receives customization information from the controller and customizes a user interface of the mobile device accordingly. A status information regarding the target controllable device is received from the controller and displayed on the user interface of the mobile device. A user of the mobile device thereafter issues a command via the user interface to the controller, the command containing instruction intended for the target controllable device. The controller receives the command and operates the target controllable devices in dependence upon instruction contained in the command received from the mobile device.

20 Claims, 18 Drawing Sheets

Related U.S. Application Data continuation of application No. 16/177,622, filed on Nov. 1, 2018, now Pat. No. 10,499,102, which is a continuation of application No. 15/913,203, filed on Mar. 6, 2018, now Pat. No. 10,148,996, which is a continuation of application No. 15/404,802, filed on Jan. 12, 2017, now Pat. No. 9,942,595, which is a continuation of application No. 14/275,189, filed on May 12, 2014, now Pat. No. 9,584,848, which is a continuation of application No. 13/208,441, filed on Aug. 12, 2011, now Pat. No. 8,732,753, which is a continuation-in-part of application No. 13/150,672, filed on Jun. 1, 2011, now abandoned.

(51) Int. Cl.
| | | |
|---|---|---|
| H04N 21/6375 | (2011.01) | |
| H04N 21/647 | (2011.01) | |
| H04N 21/41 | (2011.01) | |
| H04N 21/436 | (2011.01) | |
| H04N 21/422 | (2011.01) | |
| G06F 21/30 | (2013.01) | |
| G06F 21/62 | (2013.01) | |
| H04L 12/28 | (2006.01) | |
| H04N 21/414 | (2011.01) | |

(52) U.S. Cl.
CPC ........ *H04L 12/282* (2013.01); *H04L 12/2814* (2013.01); *H04N 21/2143* (2013.01); *H04N 21/414* (2013.01); *H04N 21/4126* (2013.01); *H04N 21/41265* (2020.08); *H04L 12/2821* (2013.01)

(56) References Cited

U.S. PATENT DOCUMENTS

2008/0089277 A1* 4/2008 Alexander ............ H04W 8/005
370/328
2010/0191551 A1* 7/2010 Drance .................. G06Q 10/02
705/5

* cited by examiner

ALLOWING MOBILE DEVICE TO REMOTELY CONTROL AUTHORIZED SUBSET OF CONTROLLABLE DEVICES UTILIZING CONTENT AVAILABLE IN REGISTERED GUEST ROOM

CROSS-REFERENCE TO RELATED APPLICATIONS

This application is a continuation of U.S. patent application Ser. No. 16/671,557 filed Nov. 1, 2019, which is a continuation of U.S. patent application Ser. No. 16/177,622 filed Nov. 1, 2018, which is a continuation of U.S. patent application Ser. No. 15/913,203 filed Mar. 6, 2018, which is a continuation of U.S. patent application Ser. No. 15/404,802 filed Jan. 12, 2017, which is a continuation of U.S. patent application Ser. No. 14/275,189 filed May 12, 2014, which is a continuation of U.S. patent application Ser. No. 13/208,441 filed Aug. 12, 2011, which is a continuation-in-part of U.S. patent application Ser. No. 13/150,672 filed Jun. 1, 2011, which claims the benefit of Canadian Patent Application No. 2,709,651 filed Jun. 7, 2010. All of the above-identified applications are incorporated herein by reference.

BACKGROUND OF THE INVENTION

The invention pertains generally to remote operation of electronic devices. More specifically, the invention relates to operating one or more controllable devices in dependence upon commands received at a system controller from a mobile device.

In order to meet guest expectations, hotels must provide increasingly sophisticated media entertainment systems. However, the increased sophistication inevitably results in increased complexity, and thus the systems become "scary" to new users who may be unfamiliar with the operation of many remotes and other equipment such as set-top boxes (STBs) and personal digital recorders (PVRs) that may be found in the rooms.

To solve this problem, hotel media systems are designed to be "user-friendly". This generally means control elements such as menus and control buttons be as intuitive as possible such that a guest can easily figure out how to use the system without first having to read instructions. However, regardless of how user-friendly a system may actually be, it will still be regarded as new and therefore troublesome by a guest who is unfamiliar with the system but who needs to learn it in order to enjoy their stay. Also, because the hardware vendors for different hotels (even of the same hotel chain) may differ, the physical appearance and other control aspects of in-room media and entertainment systems may also differ from hotel to hotel. Therefore, even if each system is itself user-friendly, frequent travelers who stay at many hotels may need to learn many different media systems. The process of learning to use yet another hotel media system can detract from the overall guest experience.

BRIEF SUMMARY OF THE INVENTION

According to an exemplary configuration of the invention there is provided a media system having a media system controller and a plurality of controllable devices coupled to the media system controller by a computer network and preconfigured such that each of the controllable devices is in communication with and remotely operable by the media system controller via the computer network. A storage device stores associations between respective passkeys and one or more of the controllable devices that are currently associated therewith. The media system controller is operable to generate a passkey in response to an occurrence of a first event associated with a particular one of the controllable devices, store in the storage device an association between the passkey and the particular one of the controllable devices, and cause the passkey to be displayed by the particular one of the controllable devices. After being displayed by the particular one of the controllable devices, the passkey is entered into a mobile device operated by a user of the media system. The controller is further operable to establish data communications with the mobile device and receive the passkey from the mobile device, query the storage device to find the particular one of the controllable devices currently associated with the passkey received from the mobile device, operate the particular one of the controllable devices in dependence upon a plurality of commands received from the mobile device until an occurrence of a second event, and remove from the storage device the association between the passkey and the particular room in response to the occurrence of the second event.

According to another exemplary configuration of the invention there is provided a method of operating a plurality of controllable devices coupled to a media system controller by a computer network and preconfigured such that each of the controllable devices is in communication with and remotely operable by the media system controller via the computer network. The media system controller has a storage device storing associations between respective passkeys and one or more of the controllable devices that are currently associated therewith. The method includes generating a passkey in response to an occurrence of a first event associated with a particular one of the controllable devices; storing in the storage device an association between the passkey and the particular one of the controllable devices; displaying the passkey by the particular one of the controllable devices, whereby, after being displayed by the particular one of the controllable devices, the passkey is entered into a mobile device operated by a user of the media system; and establishing data communications with the mobile device and receiving the passkey from the mobile device. The method further includes querying the storage device to find the particular one of the controllable devices currently associated with the passkey received from the mobile device; operating the particular one of the controllable devices in dependence upon commands received from the mobile device until an occurrence of a second event; and removing from the storage device the association between the passkey and the particular one of the controllable devices in response to the occurrence of the second event.

According to another exemplary configuration of the invention there is provided a media system controller for operating a plurality of controllable devices coupled to the media system controller by a computer network and preconfigured such that each of the controllable devices is in communication with and remotely operable by the media system controller via the computer network. The media system controller includes a storage device storing associations between respective passkeys and one or more of the controllable devices that are currently associated therewith; and one or more processors. By the one or more processors executing software instructions loaded from the storage device, the one or more processors are operable to generate a passkey in response to an occurrence of a first event associated with a particular one of the controllable devices; store in the storage device an association between the passkey and the particular one of the controllable devices;

and cause the passkey to be displayed by the particular one of the controllable devices. After being displayed by the particular one of the controllable devices, the passkey is entered into a mobile device operated by a user. The controller is further operable to establish data communications with the mobile device and receive the passkey from the mobile device; query the storage device to find the particular one of the controllable devices currently associated with the passkey received from the mobile device; operate the particular one of the controllable devices in dependence upon commands received from the mobile device until an occurrence of a second event; and remove from the storage device the association between the passkey and the particular one of the controllable devices in response to the occurrence of the second event.

According to another exemplary configuration of the invention, a plurality of controllable devices is in communication with and remotely operable by a media system controller. A storage device stores associations between respective passkeys and one or more of the controllable devices that are currently associated therewith. The controller generates a passkey in response to an occurrence of a first event associated with a particular one of the controllable devices, stores in the storage device an association between the passkey and the particular one of the controllable devices, and the passkey is displayed by the particular one of the controllable devices. The passkey is entered into a mobile device by a user. The controller receives the passkey from the mobile device, finds the particular one of the controllable devices currently associated with the passkey, and operates the particular one of the controllable devices in dependence upon commands received from the mobile device until an occurrence of a second event.

According to another exemplary configuration of the invention, there is disclosed a media system comprising a media system controller and a plurality of controllable devices coupled to the media system controller by a computer network. The media system is preconfigured such that each of the controllable devices is in communication with and remotely operable by the media system controller via the computer network. The system further includes a storage device storing associations between respective passkeys and one or more of the controllable devices that are currently associated therewith. The media system controller is operable to generate a passkey in response to an occurrence of a first event associated with a particular one of the controllable devices and store in the storage device an association between the passkey and the particular one of the controllable devices. The media system controller is further operable to cause the passkey to be displayed by the particular one of the controllable devices, whereby, after being displayed by the particular one of the controllable devices, the passkey is entered into a mobile device operated by a user of the media system. The media system controller is further operable to establish data communications with the mobile device and receive the passkey from the mobile device, and query the storage device to find the particular one of the controllable devices currently associated with the passkey received from the mobile device. The media system controller is further operable to receive a plurality of status information from the particular one of the controllable devices currently associated with the passkey received from the mobile device and transfer the status information to the mobile device until an occurrence of a second event. The media system controller is further operable to remove from the storage device the association between the passkey and the particular one of the controllable devices in response to the occurrence of the second event.

According to another exemplary configuration of the invention, there is disclosed a method of status monitoring of a plurality of controllable devices coupled to a media system controller by a computer network and preconfigured such that each of the controllable devices is in communication with and remotely operable by the media system controller via the computer network. The media system controller has a storage device storing associations between respective passkeys and one or more of the controllable devices that are currently associated therewith. The method includes generating a passkey in response to an occurrence of a first event associated with a particular one of the controllable devices, and storing in the storage device an association between the passkey and the particular one of the controllable devices. The method further includes displaying the passkey by the particular one of the controllable devices, whereby, after being displayed by the particular one of the controllable devices, the passkey is entered into a mobile device operated by a user of the media system. The method further includes establishing data communications with the mobile device and receiving the passkey from the mobile device, and querying the storage device to find the particular one of the controllable devices currently associated with the passkey received from the mobile device. The method further includes receiving a plurality of status information from the particular one of the controllable devices currently associated with the passkey received from the mobile device, and transferring the status information to the mobile device until an occurrence of a second event. The method further includes removing from the storage device the association between the passkey and the particular one of the controllable devices in response to the occurrence of the second event.

According to another exemplary configuration of the invention, there is disclosed a media system controller operating a plurality of controllable devices coupled to the media system controller by a computer network and preconfigured such that each of the controllable devices is in communication with and remotely operable by the media system controller via the computer network. The media system controller includes a storage device storing associations between respective passkeys and one or more of the controllable devices that are currently associated therewith. The media system controller further includes one or more processors; wherein, by the one or more processors executing software instructions loaded from the storage device, the one or more processors are operable to generate a passkey in response to an occurrence of a first event associated with a particular one of the controllable devices. The media system controller is further operable to store in the storage device an association between the passkey and the particular one of the controllable devices and cause the passkey to be displayed by the particular one of the controllable devices, whereby, after being displayed by the particular one of the controllable devices, the passkey is entered into a mobile device operated by a user. The media system controller is further operable to establish data communications with the mobile device and receive the passkey from the mobile device and query the storage device to find the particular one of the controllable devices currently associated with the passkey received from the mobile device. The media system controller is further operable to receive a plurality of status information from the particular one of the controllable devices currently associated with the passkey received from the mobile device and transfer the status information to the mobile device until an occurrence of a second event. The media system controller is further operable to remove from the storage device the association between the passkey and the particular one of the controllable devices in response to the occurrence of the second event.

According to another exemplary configuration of the invention, there is disclosed a media system including a controller, a plurality of controllable devices, and a storage device. The controller generates a passkey in response to an occurrence of a first event associated with a particular one of the controllable devices. The controller stores in the storage device an association between the passkey and the particular one of the controllable devices. The controller causes the passkey to be displayed on a display device. After being displayed by the particular one of the controllable devices, the passkey is entered into a mobile device by a user in order to cause the mobile device to become associated with the particular one of the controllable devices. The controller determines a list of media content including only content that is available for use by the particular one of the controllable devices. At least two of the plurality of controllable devices have a different sets of content available for use thereon. The controller transfers the list of media content to the mobile device via a computer network. The controller passes one or more commands received from the mobile device to the particular one of the controllable devices thereby allowing the mobile device to initiate one or more media functions on the particular one of the controllable devices utilizing first content selected from the list of media content until an occurrence of a de-authorization event. The controller removes from the storage device the association between the passkey and the particular one of the controllable devices in response to the occurrence of the de-authorization event.

According to another exemplary configuration of the invention, there is disclosed a method of providing remote control of controllable device for performing media functionality with a customized content list. The method includes generating a passkey in response to an occurrence of a first event associated with a particular one of a plurality of controllable devices, storing in a storage device an association between the passkey and the particular one of the controllable devices, and causing the passkey to be displayed on a display device. After being displayed by the particular one of the controllable devices. The passkey is entered into a mobile device by a user in order to cause the mobile device to become associated with the particular one of the controllable devices. The method further includes determining a list of media content including only content that is available for use by the particular one of the controllable devices. At least two of the plurality of controllable devices have a different sets of content available thereon. The method further includes transferring the list of media content to the mobile device via a computer network. The method further includes passing one or more commands received from the mobile device to the particular one of the controllable devices thereby allowing the mobile device to initiate one or more media functions on the particular one of the controllable devices utilizing first content selected from the list of media content until an occurrence of a de-authorization event. The method further includes removing from the storage device the association between the passkey and the particular one of the controllable devices in response to the occurrence of the de-authorization event.

According to another exemplary configuration of the invention, there is disclosed a controller in a media system. The controller includes a communications interface coupled to a computer network, a storage device, and one or more processors coupled to the communications interface and the storage device. By the one or more processors executing software instructions loaded from the storage device, the one or more processors are configured to generate a passkey in response to an occurrence of a first event associated with a particular one of a plurality of controllable devices, store in the storage device an association between the passkey and the particular one of the controllable devices, and cause the passkey to be displayed on a display device. After being displayed by the particular one of the controllable devices, the passkey is entered into a mobile device by a user in order to cause the mobile device to become associated with the particular one of the controllable devices. The one or more processors are further configured to determine a list of media content including only content that is available for use by the particular one of the controllable devices. At least two of the plurality of controllable devices have a different sets of content available thereon. The one or more processors are further configured transfer the list of media content to the mobile device via the computer network and pass one or more commands received from the mobile device to the particular one of the controllable devices thereby allowing the mobile device to initiate one or more media functions on the particular one of the controllable devices utilizing first content selected from the list of media content until an occurrence of a de-authorization event. The one or more processors are further configured remove from the storage device the association between the passkey and the particular one of the controllable devices in response to the occurrence of the de-authorization event.

According to another exemplary configuration of the invention, there is disclosed a mobile device configurable by a controller of a hospitality establishment to remotely operate a target controllable device of the hospitality establishment, the target controllable device being communicatively coupled to the controller of the hospitality establishment. The mobile device includes a user interface, a communication interface, a storage device and one or more processors coupled to the communication interface and the storage device. By the one or more processors executing a plurality of software instructions loaded from the storage device, the one or more processors are configured to detect a network to which the controller of the hospitality establishment is coupled and establish a connection with the network via the communication interface, such that the mobile device is now enabled for two-way communication with the controller. The one or more processors are further configured to receive from the controller customization information specific to the hospitality establishment and in response customize the user interface of the mobile device utilizing the customization information received from the controller. The one or more processors are further configured to send an identification information of the mobile device to the controller, the identification information utilized by the controller to authenticate the mobile device and in response to a successful authentication of the mobile device by the controller, receive a status information regarding the target controllable device from the controller. The status information is displayed on the user interface to a user of the mobile device, thereby allowing the user to issue a command to remotely operate the target controllable device after the user has viewed the status information. The one or more processors are further configured to receive the command from the user interface, determine that the command is a request portion of a request-response transaction intended for the target controllable device and transmit the command to the controller, wherein after receiving the command, the controller sends a corresponding instruction to the target controllable device and thereafter monitors the target controllable device for an execution of the corresponding instruction.

According to another exemplary configuration of the invention, there is disclosed a method of remotely operating a target controllable device in a hospitality establishment by a mobile device, the target controllable device communicatively coupled to a controller of the hospitality establishment. The method includes receiving at the mobile device a customization information specific to the hospitality establishment and customizing a user interface of the mobile device utilizing the customization information. The method further includes sending an identification information of the mobile device to the controller, wherein the identification information is utilized by the controller to authenticate the mobile device. In response to a successful authentication, the method further includes receiving at the mobile device a status information regarding the target controllable device and displaying the status information on the user interface to a user of the mobile device. The method further includes receiving a command from the user interface, the command issued by the user of the mobile device in response to viewing the status information, determining that the command is a request portion of a request-response transaction intended for the target controllable device and transmitting the command to the controller, wherein after receiving the command, the controller sends a corresponding instruction to the target controllable device and thereafter monitors the target controllable device for an execution of the corresponding instruction.

According to another exemplary configuration of the invention, there is disclosed a controller of a hospitality media system. The controller includes one or more communication interfaces coupled to a plurality of controllable devices, one or more storage devices, and one or more processors coupled to the one or more communication interfaces and the one or more storage devices. By the one or more processors executing a plurality of software instructions loaded from the one or more storage devices, the one or more processors are configured to receive information from a mobile device operated by a guest of the hospitality establishment via a computer network and query a database to lookup a registered guest room according to the information received from the mobile device. The one or more processors are further configured to define an authorized subset of the controllable devices according to the registered guest room, the authorized subset being one or more of the controllable devices associated with the registered guest room that the mobile device is authorized to operate. The one or more processors are further configured to determine a list of media content including only content that is available in the registered guest room, wherein at least two different guest rooms of the hospitality establishment have a different sets of content available therein and transfer the list of media content to the mobile device via the computer network. The one or more processors are further configured to pass one or more commands received from the mobile device to one or more of the authorized subset of the controllable devices thereby allowing the mobile device to initiate one or more media functions on the one or more of the authorized subset of the controllable devices utilizing first content selected from the list of media content until an occurrence of a de-authorization event.

According to another exemplary configuration of the invention, there is disclosed a hospitality media system. The system includes a plurality of controllable devices and a controller coupled to the controllable devices. By one or more processors of the controller executing a plurality of software instructions loaded from the one or more storage devices, the controller is configured to receive information from a mobile device operated by a guest of the hospitality establishment via a computer network, query a database to lookup a registered guest room according to the information received from the mobile device, and define an authorized subset of the controllable devices according to the registered guest room, the authorized subset being one or more of the controllable devices associated with the registered guest room that the mobile device is authorized to operate. The controller is further configured to determine a list of media content including only content that is available in the registered guest room, wherein at least two different guest rooms of the hospitality establishment have a different sets of content available therein and transfer the list of media content to the mobile device via the computer network. The controller is further configured to pass one or more commands received from the mobile device to one or more of the authorized subset of the controllable devices thereby allowing the mobile device to initiate one or more media functions on the one or more of the authorized subset of the controllable devices utilizing first content selected from the list of media content until an occurrence of a de-authorization event.

According to another exemplary configuration of the invention, there is disclosed a method of providing remote control of a plurality of controllable devices in a hospitality establishment. The method includes receiving information from a mobile device operated by a guest of the hospitality establishment via a computer network, querying a database to lookup a registered guest room according to the information received from the mobile device, and defining an authorized subset of the controllable devices according to the registered guest room, the authorized subset being one or more of the controllable devices associated with the registered guest room that the mobile device is authorized to operate. The method further includes determining a list of media content including only content that is available in the registered guest room, wherein at least two different guest rooms of the hospitality establishment have a different sets of content available therein, transferring the list of media content to the mobile device via the computer network, and passing one or more commands received from the mobile device to one or more of the authorized subset of the controllable devices thereby allowing the mobile device to initiate one or more media functions on the one or more of the authorized subset of the controllable devices utilizing first content selected from the list of media content until an occurrence of a de-authorization event.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof.

DETAILED DESCRIPTION

Figure 1:
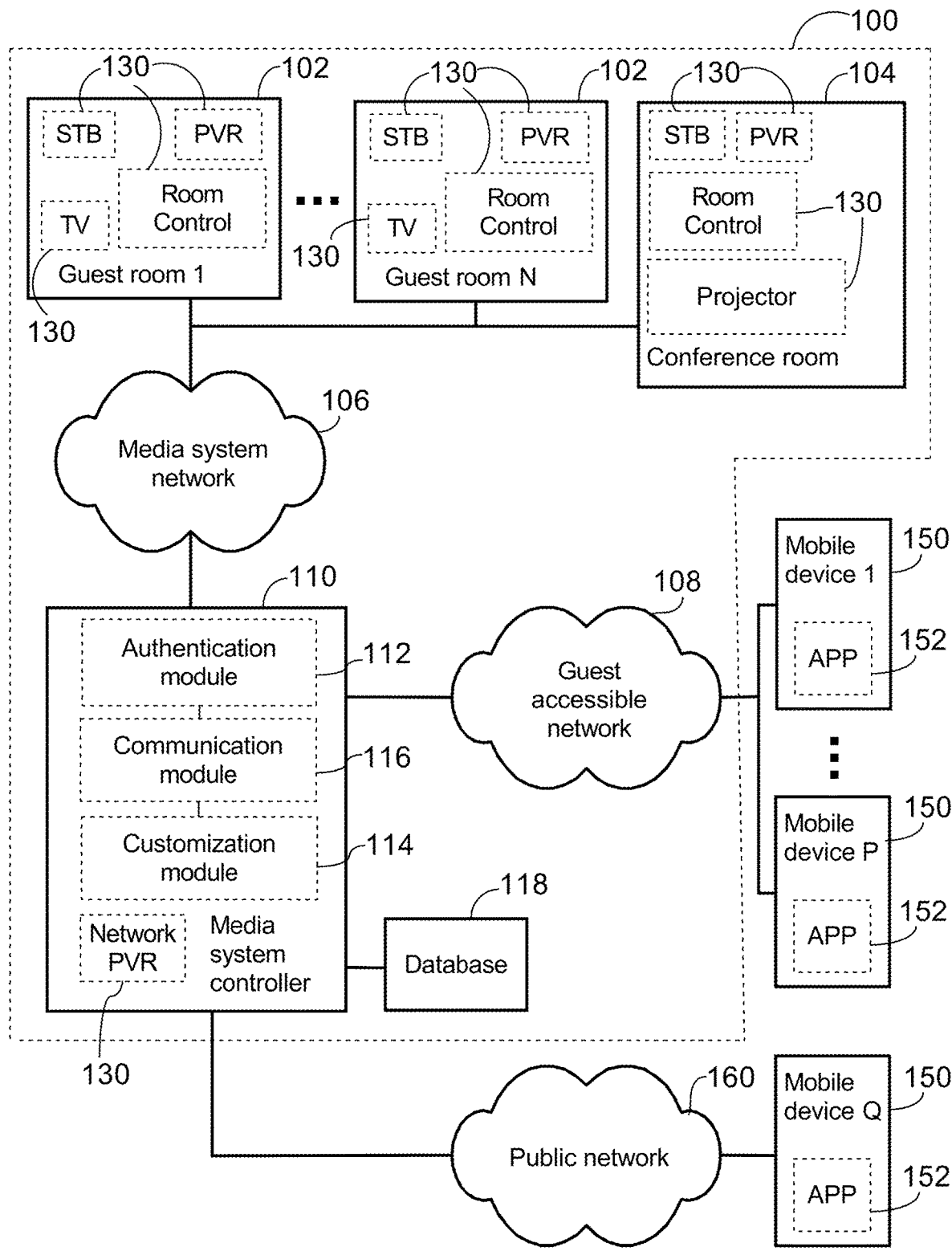
FIG. 1 is a block diagram of a hotel media system having controllable devices being operated by mobile devices according to an exemplary configuration of the invention.

FIG. 1 is a block diagram of a hotel media system 100 having controllable devices 130 being operated by a plurality of mobile devices 150 according to an exemplary configuration of the invention. In this configuration, a media system controller 110 includes an authentication module 112 and a customization module 114 coupled to a communication module 116. The media system controller 110 is coupled through a media system network 106 to each guest room 102 and to a conference room 104. The media system controller 110 is coupled to and communicates with the controllable devices 130 and delivers media and entertainment content through the media system network 106. Each guest room 102, 104 includes one or more in-room controllable devices 130 such as a set-top box (STB), personal video recorder (PVR), television (TV), projector, and room control box, which can each be operated by the media system controller 110. In this example, the room control box allows electronic control of elements in the room 102, 104 such as air conditioning, lighting, heating, fans, doors, windows, blinds, etc. Additionally, the media system controller 110 itself includes a networked personal video controller (network PVR) being a further controllable device 130. Any number and types of controllable devices 130 may be positioned throughout the hotel media system 100 in other configurations.

Guests of a hotel often have their own mobile devices 150 such as laptop computers, tablet computers, cell phones, music players, personal digital assistants (PDAs), digital cameras, global positioning systems (GPSs), and all other kinds of personal electronic gadgets. These mobile devices 150 may be coupled to the media system controller 110 through a guest accessible network 108 that is installed throughout the hotel and available to guests of the hotel, or through a public network 160 that may be available outside the hotel such as the Internet. In another configuration, the media system network 106 and the guest accessible network 108 may be the same network. Once connected to the media system controller 110, the mobile devices 150 may operate one or more of the controllable devices 130.

In one configuration, a custom application 152 may be pre-included on each mobile device 150 or may be downloaded and installed from the media system controller 130 or another source if it is not already present on the mobile device 150. According to the type of connecting network 108, 160, the application 152 automatically detects the hotel media system 100 and establishes data communications with the communication module 116. The customization module 114 may then provide customization information specific to this particular hotel media system 100 to the application 152. Examples of the information specific to a particular hotel media system 100 may include hotel name, branding logos, color schemes, welcome messages, authentication methods, etc. The application 152 utilizes this information to customize itself for this particular hotel and then identifies itself or its operator to the authentication module 112.

Authorization limits implemented by the authentication module 112 in conjunction with a database 118 such as the hotel's property management system (PMS) determine which controllable device(s) 130 may be operated by a particular mobile device 150. After determining an authorized subset of the controllable devices 130 for which a particular mobile device 150 is authorized to operate, the media system controller 110 transfers status information for the authorized controllable devices 130 to the particular mobile device 150 and operates the controllable devices 130 in the authorized subset in dependence upon commands received from the particular mobile device 150. For example, in FIG. 1, a first mobile device 150 (Mobile device 1 in FIG. 1) may be authorized to operate the STB, PVR, TV, and room control devices in a first guest room (Guest room 1 in FIG. 1), and a second mobile device (Mobile device Q in FIG. 1) may be authorized to operate the STB, PVR, room control, and projector in the conference room 104. Therefore, the first mobile device will only be able to see status information from and send commands to the in-room controllable devices 130 of the first guest room, and the second mobile device will only be able to see status information from and send commands to the in-room controllable devices 130 of the conference room 104.

Figure 2:
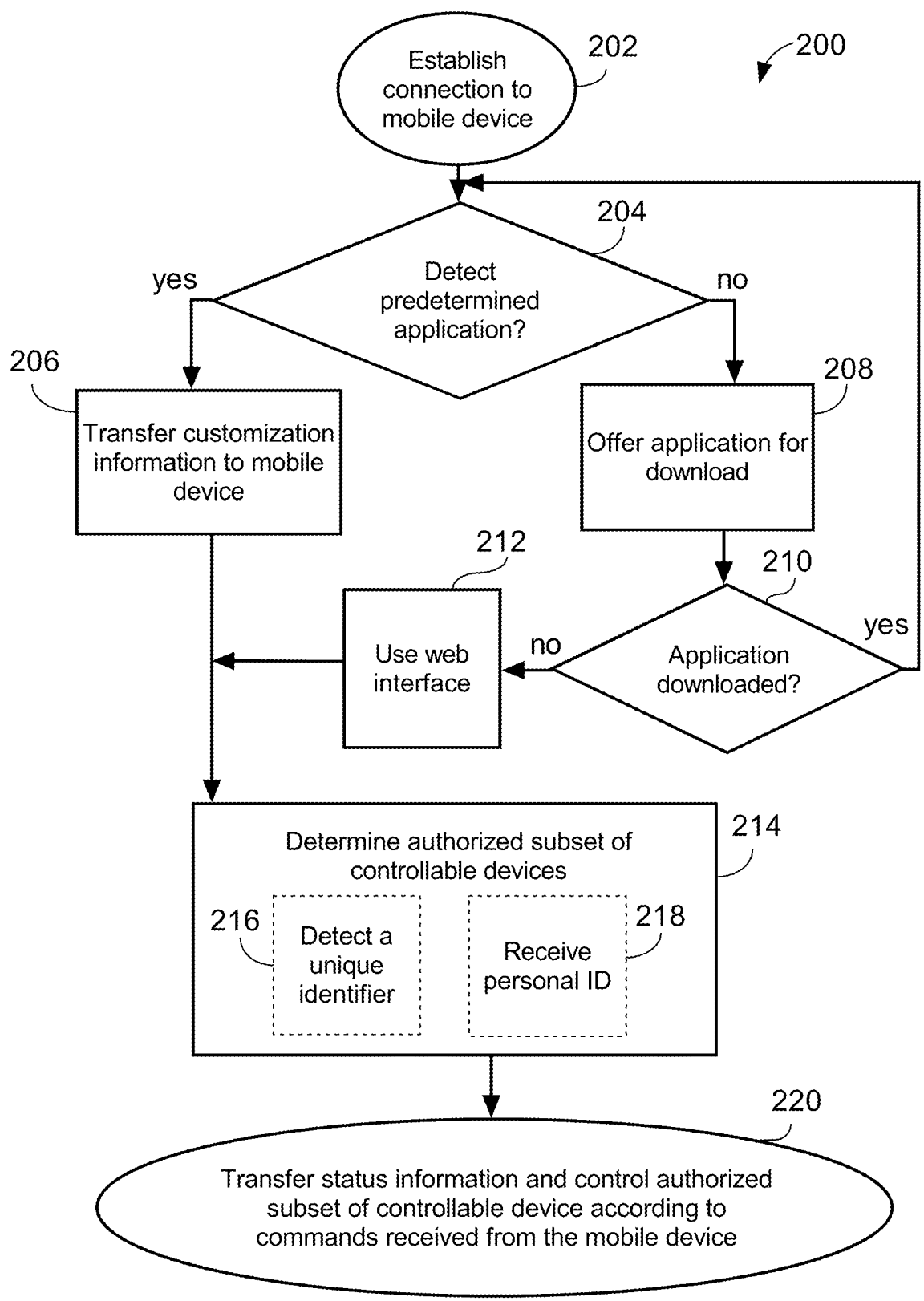
FIG. 2 is an operational flowchart of the hotel media system of FIG. 1.

FIG. 2 is an exemplary operational flowchart 200 of the hotel media system of FIG. 1. The steps of flowchart 200 are not restricted to the exact order shown, and, in other configurations, shown steps may be omitted or other intermediate steps added. In this configuration, the hotel media system 100 performs the following operations:

Step 202: A connection is established between the hotel media system 100 and a mobile device 150 in order to pass data between the media system 100 and the mobile device 150. To ensure privacy, the data flowing through the connection may encrypted in both directions such that a third party will not be able to read or understand any of the information. The connection may be established via wired access ports such as USB, FireWire, Ethernet, etc or wireless access ports such as using Bluetooth, Wi-Fi, WLAN, etc, and, as previously mentioned, a computer network used to make the connection may be a guest accessible network 108 available only on the hotel premises or via any public network 160 such as the Internet available from other locations such as a wireless hotspot at a local coffee shop. The connection to the mobile device 150 may be dynamically established through any computer network access ports, and the ports utilized may change as the mobile device 150 moves to new locations. In general, any type of connection may be established between the hotel media system 100 and the mobile device 150.

Step 204: The hotel media system 100 detects whether a media system control application 152 is running on the mobile device 150. This detection may be performed by attempting a connection to the mobile device 150 utilizing a predetermined handshake protocol that is known only to the application 152. Alternatively, the mobile device may simply identify itself and include a version number of the media system control application 152 if it is installed and running on the mobile device 150 at the time the connection is established.

Step 206: Assuming the mobile device 150 is running the application 152, the hotel media system 100 may next transfer customization information specific to this particular hotel media system 100 to the mobile device 150. By way of example, the customization information may provide any required information and data to properly brand the user interface (UI) of the application 152 and to enable or disable various features according to what is supported by this specific hotel media system 100. Transferring customization information to the mobile device 150 is useful because different hotel chains may all support the same mobile application 152 but will place their own logos on the application 152 for branding purposes. Also, some hotels may allow remote control of particular types of in-room devices as part of the media system 100 and others may not. Rather than transferring all the customization data, a customization token corresponding to a specific hotel may be transferred instead. In this configuration, customization information for the hotel corresponding to the token is already stored within the mobile device 150 and will be utilized by the application 152. Transferring only a hotel specific token speeds connection time for subsequent connections by the same mobile device 150 when the full customization information has already been downloaded.

Step 208: Because the media control application 152 was not detected, the hotel media system 100 offers the application 152 for download by the mobile device 150. In one configuration, the hotel media system 100 may automatically detect the type of the mobile device 150 and offer a compatible application 152. In another configuration, the media system 100 may provide a web interface allowing an operator of the mobile device 150 to select and choose a desired application from a list of supported device platforms. In yet another configuration, the application 152 may be stored and made available from a third-party site such as an application store. In this case, the hotel media system may provide a link to where the application 152 may be retrieved.

Step 210: If the user has downloaded the application 152 or at least indicated they plan to use the application 152 (if the application is available from a third-party), the hotel media system will return to step 204 and continue trying to detect the application 152. However, in some cases, the user of the mobile device 150 may not wish to use a custom media control application 152 and will instead opt to continue without installing the media application 152. Some aspects of controlling the hotel media system 100 are facilitated and enhanced by running a media control application 152 on the mobile device 150. One reason is the required data to be transmitted will be minimized if the device 150 already has the control application 152 installed. Another reason is automatic detection, connection, and authentication with the hotel media system 100 can be performed by an application but may need to be performed manually by a user of a web interface. Also, better integration with the UI of the mobile device 150 and background operation are both possible with a custom application 150. However, there is an advantage to not requiring users to install and run the media control application 152. For example, by providing a web interface to the hotel media system 100, full compatibility with any device that is able to browse the web is achieved. This may be useful to users who are unwilling or unable to install a custom application 152 on their mobile device 150.

Step 212: Because the mobile device is not running the media control application 152, the communication module 116 acts as a web server and a web interface is provided to the mobile device 150. Again, to ensure privacy and prevent unauthorized access from third parties, the web interface may be encrypted using a secure sockets layer (SSL).

Step 214: At this step, the hotel media system 100 determines an authorized subset of the controllable devices 130 for which the mobile device 150 is authorized to operate. Generally speaking, the authentication module 112 receives some identification information from the mobile device 150 corresponding to either the mobile device itself or an operator of the mobile device 150 and then looks up in a database 118 to determine which controllable devices 130 are permitted to be operated by this mobile device or operator. For example, the authentication module 112 may query a database 118 such as the hotel's property management system (PMS) to make sure the guest's name, MAC address, GSM SIM card number, passkey, and/or reservation number are correct for a particular hotel room and authorize the user. In this configuration, the database 118 includes data associating the identification information with one or more registered guest rooms and the authorized subset includes the in-room controllable devices 130 that are accessible from the room(s) for which the operator of the mobile device is currently registered. Steps 216 and 218 may also be utilized, alone or in combination, to receive the identification information corresponding to the mobile device 150 and/or the operator of the mobile device 150.

Step 216: The authentication module 112 may automatically detect a unique identifier received from the hardware or software of the mobile device 150. Some examples of unique identifiers include Global System for Mobile Communications (GSM) subscriber identity module (SIM) card number, media access control (MAC) address, internet protocol (IP) address, web browser identification from a previously stored cookie, media control application 152 serial number, etc. The unique identifier of the mobile device 150 can be mapped in the database 108 to the authorized subset of controllable devices. In one configuration, the authentication module 110 determines the registered guest room currently associated with the unique identifier by querying the database 108, which includes authentication data associating the unique identifier of the mobile device 150 with a registered guest room. The authentication module 110 then includes in the authorized subset at least the in-room controllable devices of the registered guest room.

Step 218: The authentication module 112 may receive user information corresponding to an operator of the mobile device 150 such as guest name, room number, company name, address, phone numbers, credit card number, passport number, etc. In this configuration, the database 108 includes authentication data associating the user information with the registered guest room(s) for the user. However, identification information received from the mobile device 150 need not be of a personal nature and may also be implemented using usernames, pass codes, or token numbers. For example, upon check-in, a guest may be provided with a password for use when authenticating their mobile device(s) 150 with the hotel media system 100. The password may be randomly generated by the media system controller upon guest check-in and stored in the database to indicate the registered guest room associated with the password. In this way, no personal identification information need be supplied by the guest either at check-in or when authenticating their mobile device(s) 150. Alternately, the authentication module 112 may automatically display a passkey on an interface such as a TV in the guest's room and ask the guest to enter this passkey to confirm the guest is registered for the particular room. This may be similar to the process used to pair Bluetooth devices, except the medium for transport of data could be wired, wireless, Bluetooth, cell, etc; and after receiving the correct passkey for a particular room, the authentication module 110 includes in the authorized subset all the in-room controllable devices of the guest room associated with the passkey. In another advantageous configuration, receiving the identification information corresponding to the operator of the mobile device 150 at step 218 may only need to be performed once per mobile device 150. Once received, a unique identifier from the mobile device 150 such as automatically detected at step 216 can be stored in the database 108 with an association to the registered guest room. For subsequent authentications by the same mobile device 150, the automatic detection of the unique identifier at step 216 may be sufficient to determine the registered guest room and authenticate the mobile device 150.

Step 220: Once the mobile device 150 is authenticated, the hotel media system 100 transfers any status information from the authorized subset of the controllable devices 130 to the mobile device 150, and controls the authorized subset of the controllable devices 130 according to commands received from the mobile device 150. For example, the status information may include UI menus for each of the controllable devices 130 in the authorized subset, and the commands received from the mobile device 150 may include UI selections for operating each of the controllable devices 130 in the authorized subset. At this step, the authorized subset of controllable devices 130 may be operated in accordance with commands received from the mobile device 150.

Other steps may also be included such as if a user is not authorized at step 214, actions such as providing an error message or other assistance to the guest may be provided by the hotel's media system 100. Because the user of the mobile device is not authenticated, the hotel media system 100 may provide only general services and information to the mobile device 150 but no specific room control services until the mobile device 150 tries to re-authenticate. Control may proceed back to step 214 when the mobile device tries to re-authenticate.

Figure 3:
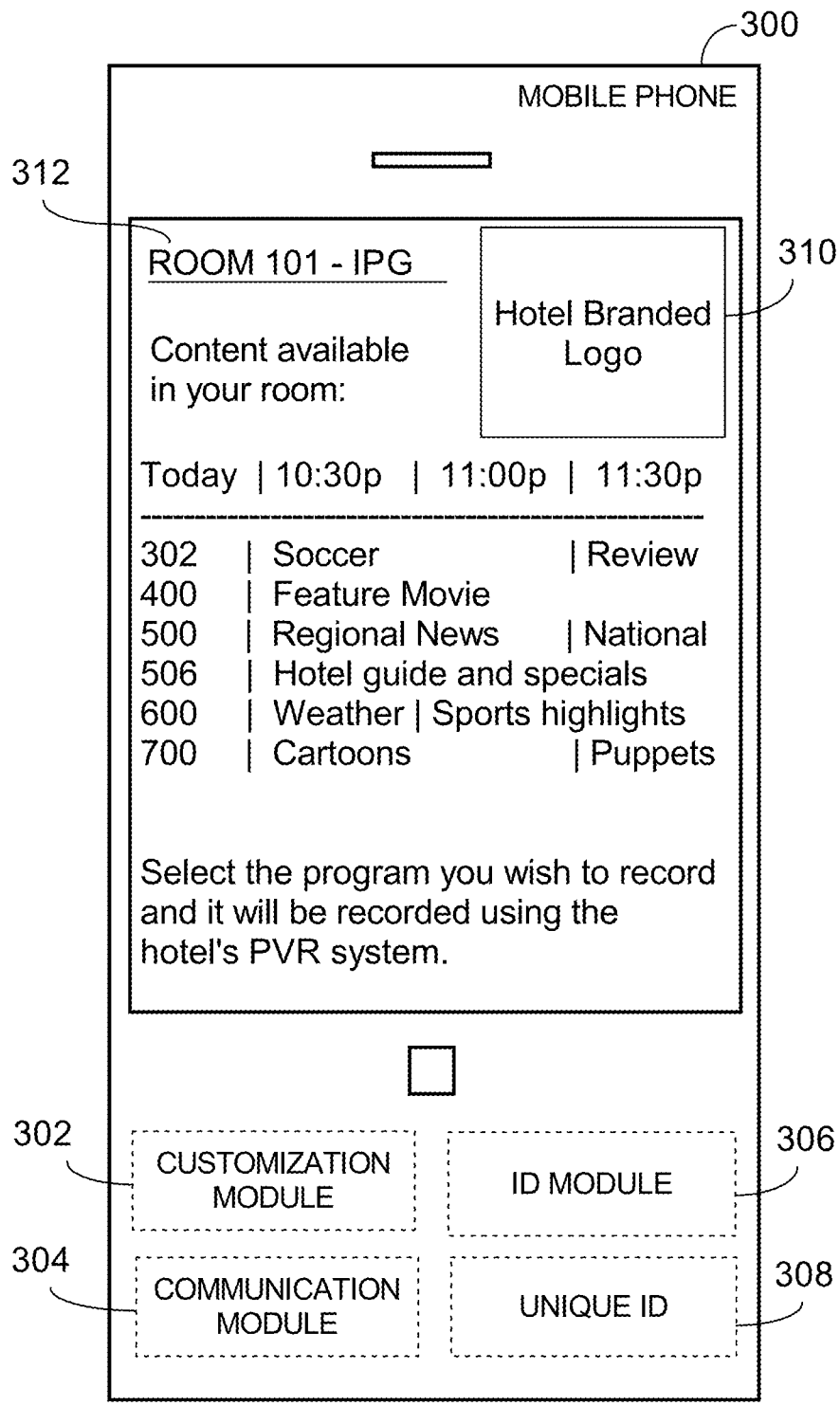
FIG. 3 is a block diagram of a mobile phone being one of the mobile devices of FIG. 1.

FIG. 3 is an exemplary block diagram of a mobile phone 300 being one of the mobile devices 150 of FIG. 1. In this configuration, the mobile phone 300 includes a user interface (UI) 312, a customization module 302, a communication module 304, an identification module 306, and a unique identification (ID) 308. The communication module 304 may be implemented in hardware as a part of the mobile phone. For example, the phone 300 may be equipped with Bluetooth, Wi-Fi, and WLAN capabilities. Any of these may therefore be utilized to establish a connection to the hotel media system 100 via either a guest accessible network 108, public network 160, or other available access port. In this configuration, control of the mobile phone 300 is performed by a custom media control application 152 having been previously installed. However, as mentioned above, the invention may alternatively operate utilizing a web interface or the application 152 may be downloaded and installed as a part of the connection procedure. Compiled, semi-compiled code such as a Java or interpreted code such as JavaScript may also be utilized to perform the role of the media control application 152.

As an example of beneficial usage, as shown in FIG. 2, the authorized subset of the controllable devices 150 for the mobile phone 300 may include at least a PVR of a hotel room (hotel room 101 in FIG. 3). Therefore, the UI 312 of the mobile phone 300 shows an interactive program guide (IPG) of content available on the hotel's media system 100 as recordable by the PVR of room 101. Note that different rooms in the hotel may have different available content, and part of the status information sent from the hotel media system 100 to the mobile phone 300 included the content that was actually recordable by the PVR in room 101. An operator of the mobile phone 300 may schedule the PVR of room 101 to record content listed on the IPG by interacting with the UI 312 of the mobile phone 300. Corresponding commands will be sent from the mobile phone 300 to the hotel media system 100 and the hotel media system 100 will utilize these commands to operate the PVR of room 101. Additional status messages such as confirmation of the recording or conflict messages will be passed back to the UI 312 as required. In this way, the mobile phone 300 may operate the PVR of room 101 from any location as long as a connection to the media system 100 is available. The mobile phone 300 may also be authorized to operate other in-room controllable devices 130 and these other in-room controllable devices 130 could be selected and controlled using the UI 312 in a similar way. In one configuration, the media system controller 110 transfers status information to the mobile phone 300 such as data for displaying the IPG on the mobile phone 300 customized to list only the content that is available on the in-room controllable devices 130 of the guest's registered room. A benefit of such operation is a guest staying in a budget room will not see content listed on the IPG that is only available in other rooms of the hotel with higher entitlements.

Regarding additional features of the phone 300, the customization module 304 of the mobile phone 300 receives the customization information sent from the customization module 114 of the media system controller 110. For example, a hotel branded logo 310 may be utilized by the mobile phone 300 to customize the UI 312 when operating the media system 100 at a particular hotel. The ID module 306 is responsible for identifying the mobile phone 300 to the hotel media system 100 and may also store identification information that needs to be remembered for authentication purposes. For example, a pass code that a guest was given at check-in for authenticating their mobile device(s) 150 may be stored within the ID module 306. The ID module 306 may also automatically pass a unique ID 308 such as the GSM SIM card number, MAC address, software serial number, or browser cookie to the authentication module 112 of the hotel's media system controller 110 to allow determination of the authorized controllable devices.

Figure 4:
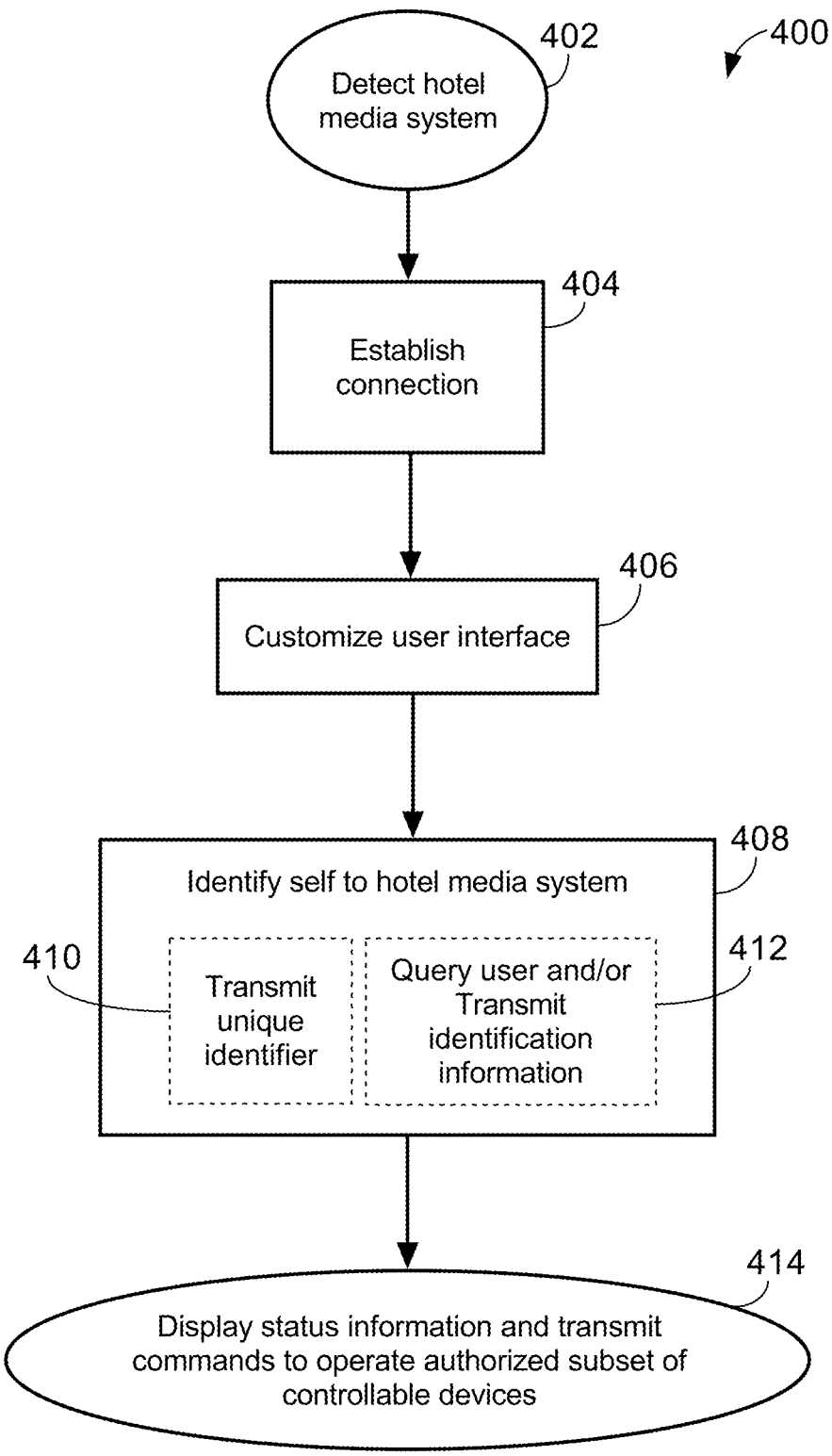
FIG. 4 is an operational flowchart of the mobile phone of FIG. 3.

FIG. 4 is an exemplary operational flowchart 400 of the mobile phone 300 of FIG. 3. The mobile phone 300 of FIG. 3 is taken as an example but similar steps may also apply to the other mobile devices 150 of FIG. 1. The steps of flowchart 400 are not restricted to the exact order shown, and, in other configurations, shown steps may be omitted or other intermediate steps added. In this configuration, the mobile phone 300 performs the following operations:

Step 402: The mobile phone 300 may automatically detect the existence of the hotel media system by recognizing a hotel Wi-Fi access point by service set identifier (SSID), recognizing a cell tower identification that is near the hotel, determining the mobile phone 300 is physically located near a predetermined GPS coordinate corresponding to the geographic location of the hotel as detected by a GPS unit (not shown) of the mobile phone 300, detecting a hotel's Bluetooth network or infrared signal, establishing a wired connection with the hotel's Ethernet or DSL system, or by simply recognizing broadcast packets from the hotel that are received on one of the mobile phone's 300 network interfaces at communication module 304. The SSIDs, cell tower IDs, GPS coordinates, and formats of broadcast packets of various hotels may be preprogrammed as a part of the media control application 152 or may be stored remotely such as at a publicly accessible Internet site that is periodically accessed by the application 152. In a manual configuration, an operator of the mobile phone 300 may manually specify or select the network interface and destination hotel name or address such as a domain name that corresponds to the hotel. This may be beneficial if the guest is not physically near the hotel and is instead accessing the hotel media system 100 through a public network 160 such as the Internet.

Step 404: Once the hotel's media system 100 is detected, in one configuration, the communication module 304 of the mobile phone 300 performs data communication with the hotel media system such as by establishing a two-way data connection with the communication module 116 of the hotel's media system controller 110. Again, this connection and the data transferred through the connection may be encrypted for privacy. Other data communication methods may also be utilized in other configurations including connectionless datagram communication types, for example.

Step 406: The mobile phone 300 customizes its user interface according to the particular hotel and any customization information that is received from the hotel. This may include branding information such as the hotel logo 310, color schemes or other elements.

Step 408: The ID module 306 identifies the mobile phone 300 to the authentication module 112 of the hotel's media system controller 100. Because the goal may actually be to identify the user of the mobile phone 300, one method may be to query the user of the mobile phone 300 to enter, via a UI prompt, their name and room number and then pass this information to the hotel media system 100. This user information could already be known by the application so it could be done automatically without requiring user interaction. (User had already entered their name on the device and the room number was known at the time of reservation.) For privacy and security reasons, it is not necessary that any personal information be transmitted to the media system 100 to perform authentication. Another method to authenticate the mobile phone 300 would be via a MAC address or GSM SIM card number of the user's device that was associated with the guest during the reservation process. A registration confirmation number could also be utilized. Another method may be to authenticate with the media system 100 through a passkey given out by an interface in the room (ie. through the TV). Sub steps 410 and 412 contain more information about identification techniques and may be performed together in either order or only one may be performed according to different configurations.

Step 410: The ID module 306 transmits a unique identifier of the mobile device such as the mobile phone's GSM SIM card number or MAC address to the authentication module 112.

Step 412: The ID module 306 transmits identification information corresponding to a user of the mobile device to the authentication module 112. The ID module 306 may first utilize the UI 312 to query a user of the mobile phone for the identification information and store it within the ID module 306, or the identification information may already be stored within the ID module 306.

Step 414: The mobile phone 300 now displays the status information received from the authorized subset of controllable devices 150 and transmit commands to operate the authorized subset of controllable devices 150. Each of the authorized controllable devices 150 may be operated using a separate screen on the UI 312 of the mobile phone if space is limited. Alternatively, on a mobile device 150 such as a laptop computer, all of the (or multiple) authorized controllable devices 150 may be visible on a single screen.

Figure 5:
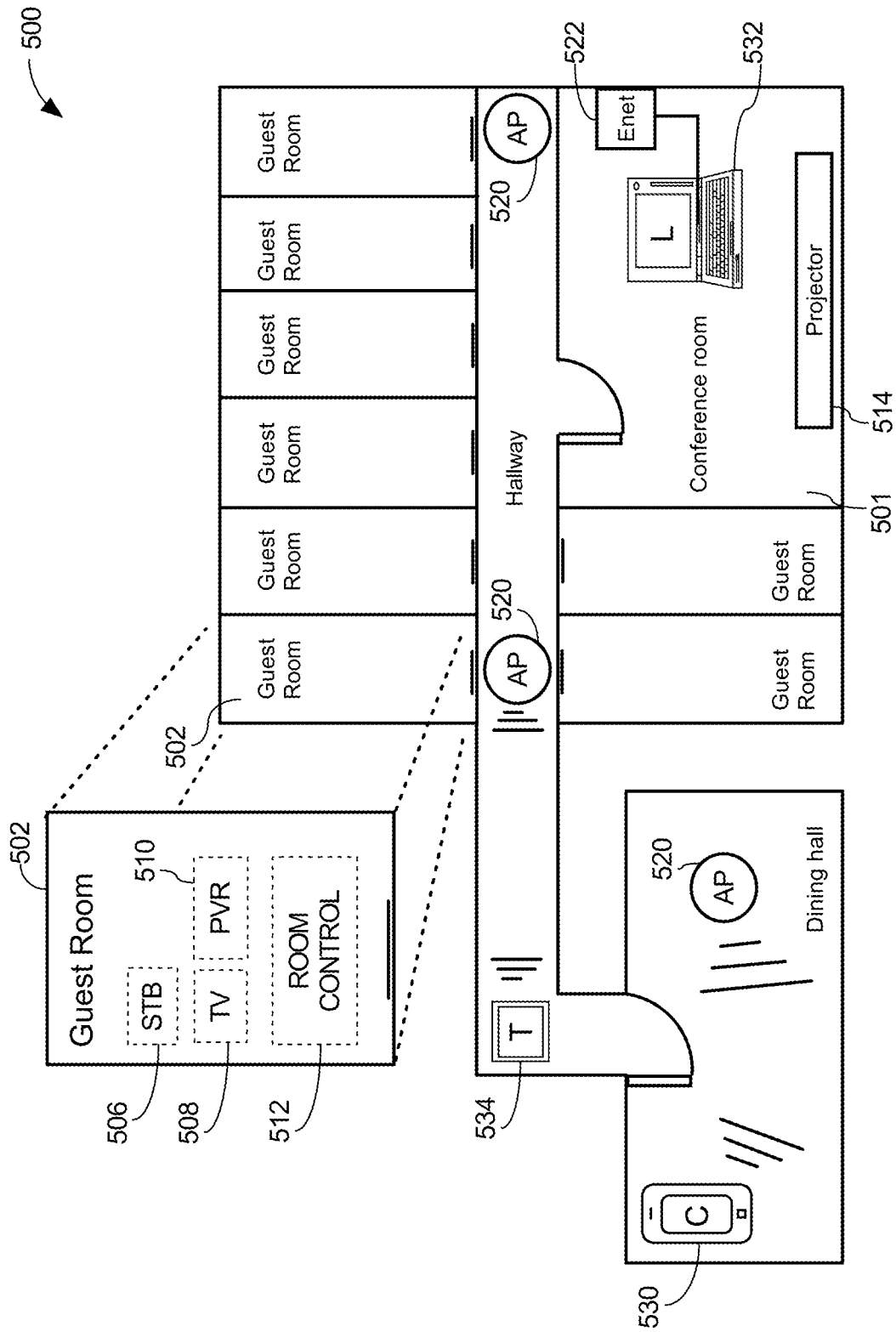
FIG. 5 illustrates a hotel floor plan having multiple controllable devices being remotely operated by various mobile devices according to another exemplary configuration of the invention.

FIG. 5 illustrates a hotel floor plan 500 having multiple controllable devices 506, 508, 510, 512, 514 being remotely operated by various mobile devices 530, 532, 534 according to another exemplary configuration of the invention. As shown in FIG. 5, the hotel includes a plurality of guest rooms including a particular room 502 being shown with an expanded view. As shown in the expanded view, installed in guest room 502 are several in-room controllable devices including a STB 506, TV 508, PVR 510, and room control box 512; and installed in a conference room 501 is an in-room controllable projector 514. Access ports for a guest accessible computer network 108 are distributed throughout the hotel including wireless access points (APs) 520 and a wired Ethernet connection 522. In this example, there are three mobile devices illustrated including a cell phone 530, a laptop computer 532, and a tablet computer 534.

Figure 6:
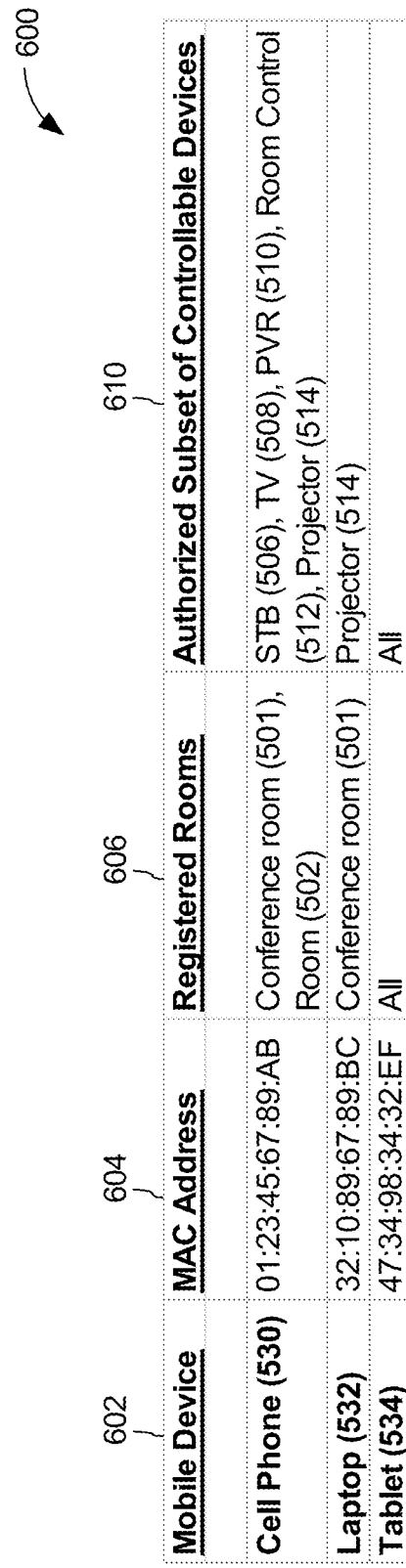
FIG. 6 shows an exemplary data structure of a database for performing authentication of the mobile devices of FIG. 5.

FIG. 6 shows an exemplary data structure of a database 118 for performing authentication of the mobile devices 530, 532, 534 of FIG. 5. The database structure 600 includes authentication data for each mobile device 530, 532, 534 organized in rows with a mobile device column 602 indicating the particular mobile device name, a MAC address column 604 indicating a unique ID being associated with the hardware of the mobile device, a registered rooms column 606 indicating one or more registered guest rooms currently associated with the mobile device, and an authorized subset of controllable devices column 610 indicating the subset of the possible controllable devices 506, 508, 510, 512, 514 that are authorized to be operated. As illustrated, in this configuration, the authorized subset of controllable devices column 610 includes the in-room controllable devices of the guest rooms included in the registered rooms column 606. Other configurations of the database 118 may also be utilized. For example, rather than (or in addition to) the MAC address column 604, a user information column may be included to associate certain user information such as the guest's name or login ID with one or more registered guest rooms and corresponding in-room controllable devices.

Figure 10:
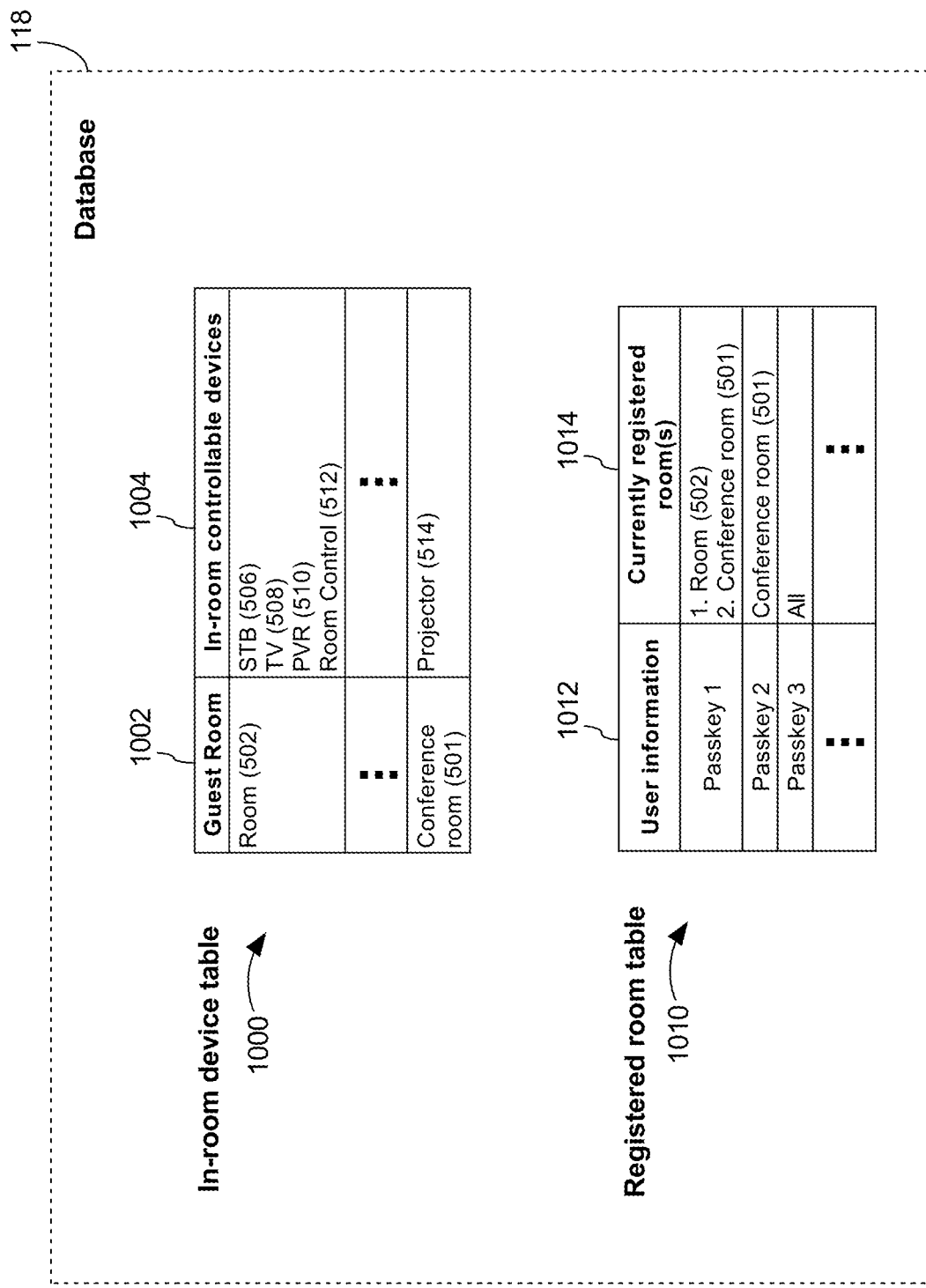
FIG. 10 illustrates an exemplary data structure of a multi-table database for performing authentication of the mobile devices of FIG. 5.

FIG. 10 illustrates an exemplary data structure of a multi-table configuration of database 118 for performing authentication of the mobile devices of FIG. 5. In this example, in-room device table 1000 specifies the one or more in-room controllable devices of each guest room. This table 1000 may be generally static and only change when the installed devices in one of the rooms is changed such as during installation or system upgrades. Registered room table 1010 is utilized to dynamically associate user identification information being passkeys in this example with one or more currently registered guest rooms. Table 1010 may be updated as guests check in and out of the hotel and/or change their room assignments. For example, the passkey for the conference room 501 may be changed with each booking so that users of a first conference will not be able to use the same passkey to control devices in the conference room 501 during a second conference. Likewise, the passkey associated with a particular guest room may be changed each time a new guest enters the room.

Rather than (or in addition to) the passkeys stored in user information column 1012, in another configuration, users may also be required to both specify the correct passkey and other user information such as the name of a guest currently staying in the room. The authentication module 112 receives identification information from a mobile device such as a passkey entered by the user or stored within the mobile device, queries the registered room table 1010 to determine the registered guest room currently associated with the received identification information, and includes in the authorized subset of the controllable devices for which the mobile device is authorized to operate at least the in-room controllable devices of the registered guest room(s) as specified in the in-room device table 1000. Upon successful authentication of the mobile device using user information column 1012, a unique identifier of the mobile device may also be stored and associated with one or more registered guest rooms so that the mobile device can be automatically authenticated upon next usage according to the unique identifier rather than the passkey. Combinations of the database structures of FIG. 6 and FIG. 10 may also be utilized.

Figure 11:
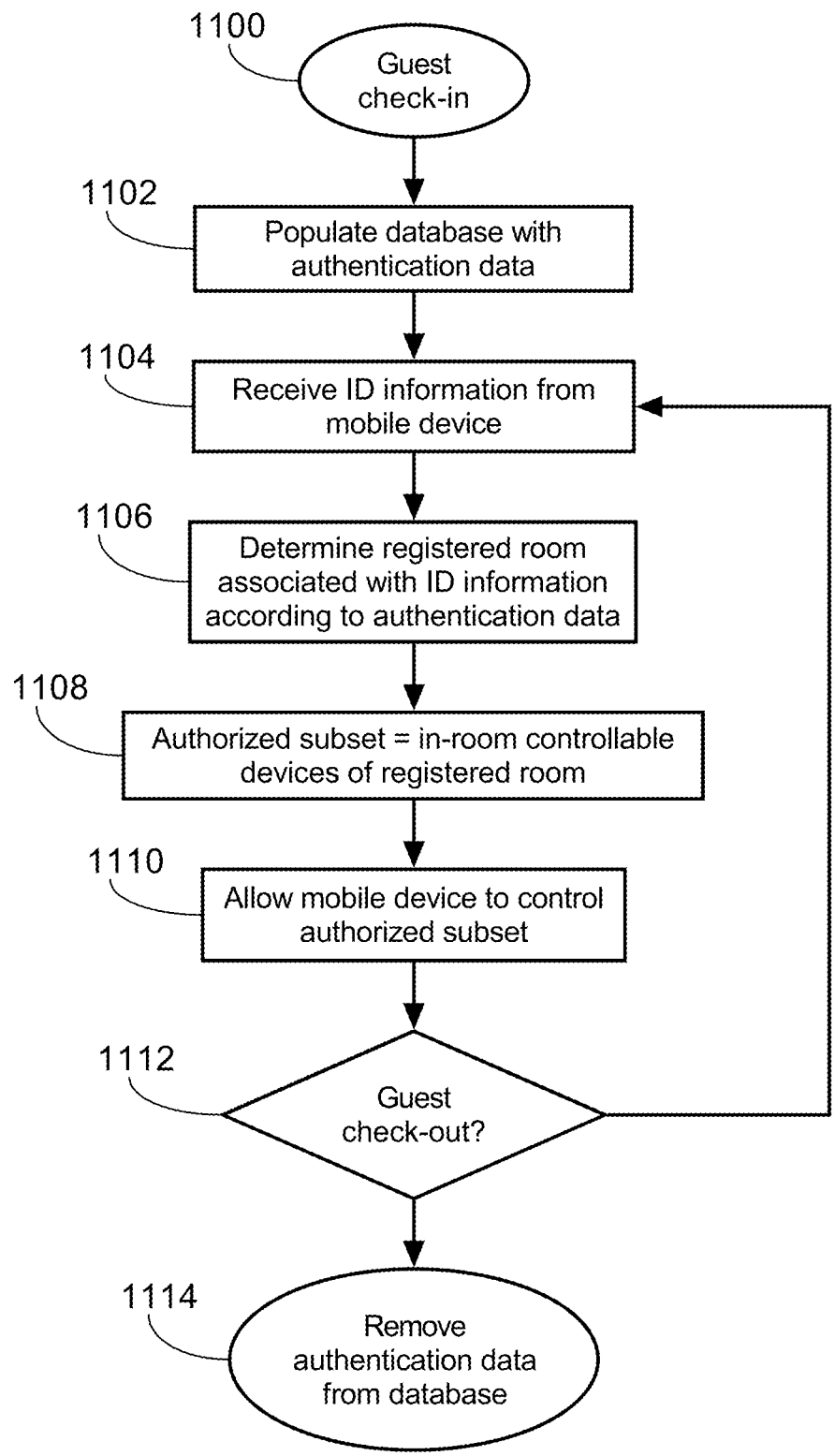
FIG. 11 is a flowchart illustrating an example of how authentication data may be utilized by the hotel media system of FIG. 1.

FIG. 11 is a flowchart illustrating an example of how authentication data may be utilized by the hotel media system of FIG. 1. The steps of the flowchart are not restricted to the exact order shown, and, in other configurations, shown steps may be omitted or other intermediate steps added. In this configuration, the hotel media system 100 performs the following operations:

Step 1100: When a guest checks in to one of the rooms in the hotel, control proceeds to step 1102. Other situations may also be deemed equivalent to guest check-in such as when a guest changes or upgrades to a different room.

Step 1102: The database 118 is populated with authentication data. For example, authentication data such as the passkey in the user information column 1012 and corresponding registered room(s) in the currently registered room(s) column 1014 may be generated and added to the registered room table 1010 at this step. The same passkey may also be provided to the guest at the front desk upon check-in, or may be selectively displayed when needed on a display device in the guest's room such as the in-room TV.

Step 1104: After data communications have been established between the guest's mobile device and the media system controller 110, the authentication module 112 receives ID information from the mobile device. Continuing the above example, the received ID information may include the passkey as entered by the guest in order to prove they are the current guest of one or more of the hotel rooms.

Step 1106: The authentication module 112 determines the registered guest room currently associated with the identification information. For example, the authentication module 112 may perform a lookup operation matching the received passkey with the same passkey stored in the user information column 1012 of registered room table 1010. In this way, the currently registered room(s) column 1014 on the matching row indicates the registered guest room currently associated with the passkey.

Step 1108: The authentication module then assigns the in-room controllable devices of the registered guest room determined at step 1106 to be the authorized subset for which the mobile device is authorized to control. For example, the authentication module 112 may perform a lookup operation to match the registered guest room determined at step 1106 with the same guest room stored in the guest room column 1002 of in-room device table 1000. The matching row indicates the corresponding in-room controllable devices in column 1004.

Step 1110: The media system controller 110 operates the authorized subset of the controllable devices determined at step 1108 in dependence upon commands received from the mobile device. In some situations involving simple commands such as volume control or channel changes, there may not be any feedback returned to the mobile device; however, preferably this step also involves sending status information corresponding to the authorized subset of the controllable devices to the mobile device. The status information helps to allow the guest to operate the in-room controllable devices even when the guest is away from the registered room.

Step 1112: When the guest checks out of the registered guest room, control proceeds to step 1114; otherwise, control returns to step 1104.

Step 1114: The authentication data is removed from the database in order to thereby de-authorize the guest's mobile devices from continuing to operate the in-room devices. In this way, should the same identification information be received at step 1104, it will no longer be associated with the registered guest room at step 1106.

In a modification of the above described flowchart, rather than populating the database 118 with the authentication data immediately after guest check-in, the authentication information of step 1102 may be dynamically added to the database 118 when the passkey is displayed on the display device in the registered guest room. In another example, the authentication data stored in the database 118 at step 1102 may corresponds to personal information of the guest dynamically added to the database 118 when the guest checks in to the registered guest room. Other steps may also be added to the flowchart of FIG. 11. For example, additional authentication data associating the unique identifier of the mobile device with the registered guest room may be dynamically added to a database table such as that illustrated in FIG. 6 when the guest registered to the room first utilizes the mobile device to authenticate with the media system controller 110.

Each mobile device 520, 532, 534 may operate the subset of the controllable devices for which it is authorized even when it is not located in the same room as the controllable device it is trying to operate. For example, as illustrated in FIG. 5, the cell phone 530 may operate the PVR 510 even while the cell phone 530 is located in the dining hall. Also, as shown in FIG. 6, in this example, all mobile devices 530, 532, 534 may operate the projector 514 in the conference room 501. This could be the situation because the operator of the cell phone 530 is a registered guest of room 502 and also a speaker of a conference, the operator of the laptop 532 may also be a speaker of the conference but is not staying at the hotel, and the tablet 534 may be carried by hotel staff to assist guests as needed and therefore is authorized to operate all controllable devices 506, 508, 510, 512, 514 in the hotel.

De-authorization of one or more controllable devices 506, 508, 510, 512, 514 may be performed by modifying the database accordingly. For example, to de-authorize the cell phone 530 from controlling the STB 506, the STB 506 may be removed from the authorized subset of controllable devices column in the FIG. 6. In one configuration, de-authorization may coincide with when the guest checks out of the registered guest room. In another configuration, it may also be useful to de-authorize a particular controllable device 130 or mobile device 150 when a conference or other hotel event ends, when a specific time period or time duration ends, during a specific time interval such as to disable staff users from controlling devices during the evening or early morning so they don't accidentally disturb the guest, etc. Allowing a user to de-authorize themselves may also be useful in some instances such as when a guest wants to lend their mobile device 150 to a third party.

Furthermore, de-authorization of a controllable device may occur on a device-level or a feature-level. For example when a guest checks out of a hotel their mobile device 150 may be de-authorized to control the TV and other in-room devices 130 but may still be authorized to review their portfolio, message inbox, etc. In another example a mobile device 150 may be de-authorized to watch or record certain TV channels due to parental lock control settings.

Figure 12:
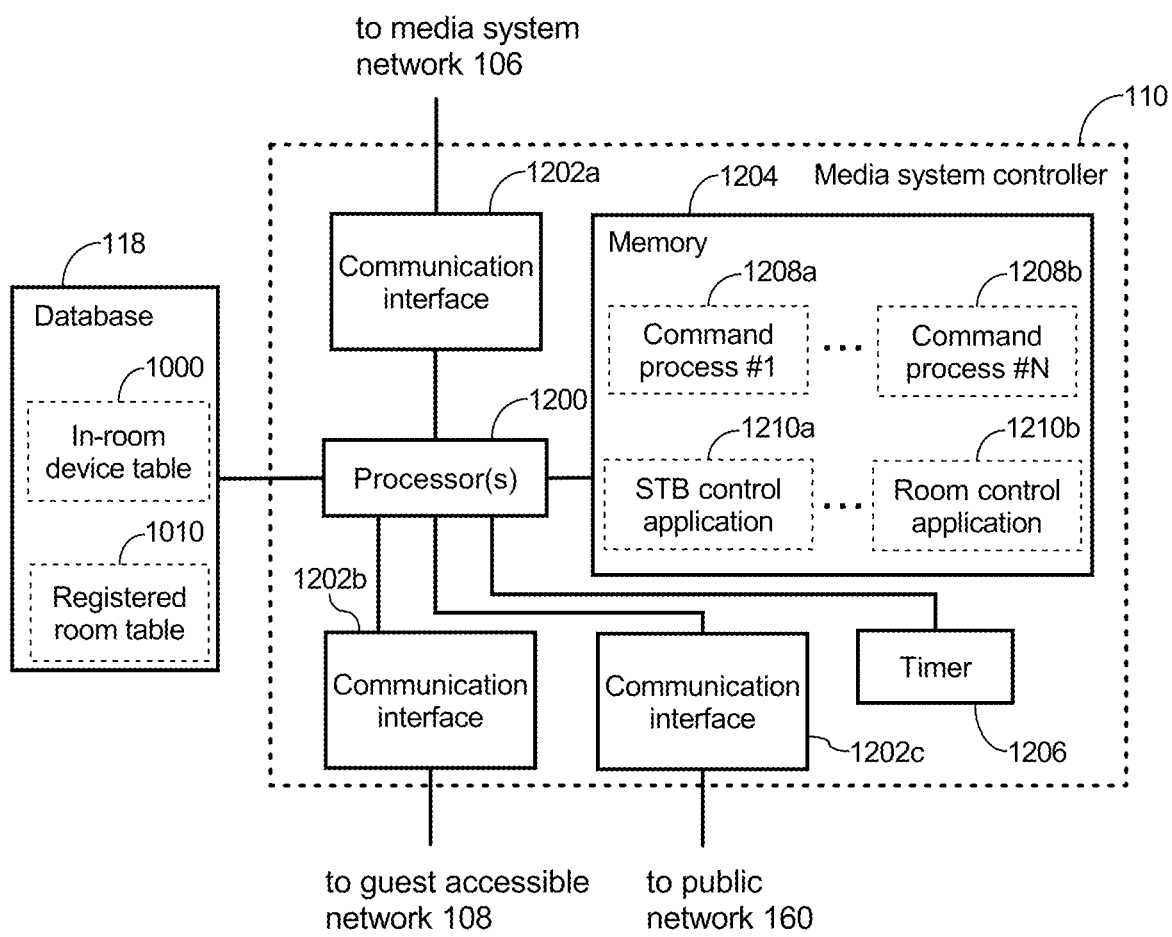
FIG. 12 illustrates an exemplary block diagram of the media system controller of FIG. 1.

FIG. 12 illustrates an exemplary block diagram of the media system controller 110 of FIG. 1. In this example, the media system controller 110 includes one or more processors 1200, one or more communication interfaces 1202, a memory 1204, and a timer 1206. The memory 1204 includes a number of software objects including a plurality of command processes 1208 and a plurality of application programs 1210. Although not illustrated in FIG. 12, the memory 1204 may also include additional software causing the processors 1200 to perform the above-described functions of the authentication module 112, the communication module 116, and the customization module 114. Three communication interfaces 1202 in this example are respectively connected to the media system network 106, the guest accessible network 108, and the public network 160. The media system controller 110 is additionally coupled to database 118, which includes the in-room device table 1000 and registered room table 1010 similar to illustrated in FIG. 10.

Figure 13:
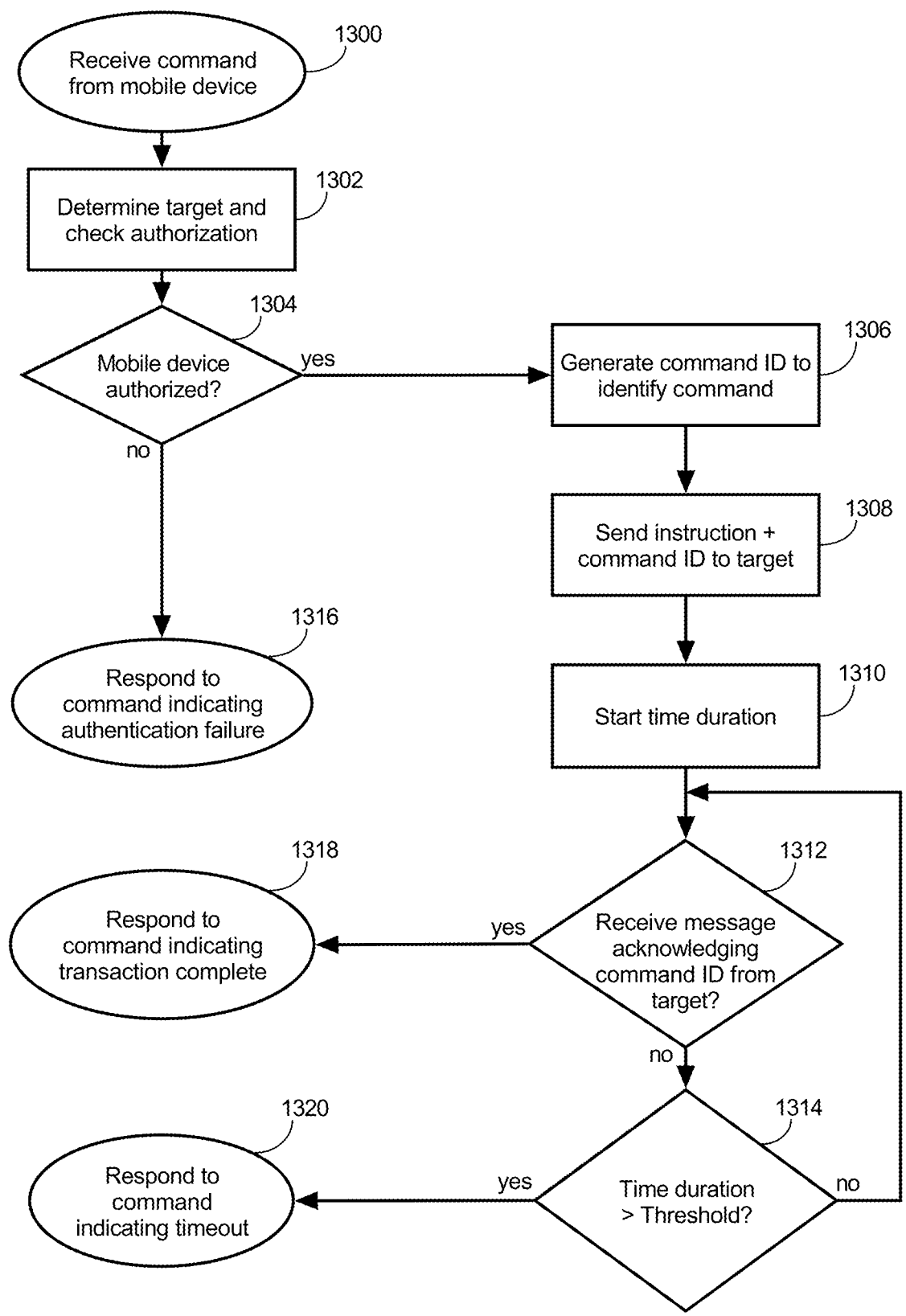
FIG. 13 is a flowchart illustrating an example of operations performed by the media system controller of FIG. 0.12 after receiving a command from a mobile device.

FIG. 13 is a flowchart illustrating an example of operations performed by the media system controller 110 of FIG. 12 after receiving a command from a mobile device 150 according to an exemplary configuration. The steps of the flowchart are not restricted to the exact order shown, and, in other configurations, shown steps may be omitted or other intermediate steps added. In this configuration, a single processor 1200 will be described for illustration purposes; however, in other configurations one more processors 1200 may act together to perform the described operations.

Step 1300: The processor 1200 receives a command sent from a mobile device 150. For example, the command may be received at either communication interface 1202b, which is coupled to the guest accessible network 108 in the hotel, or at communication interface 1202c, which is coupled to the public network 160 such as the Internet; and after the command is received at one of the communication interfaces 1202, the command is passed to the processor 1200.

Step 1302: The processor 1200 examines the command and determines a target controllable 130 device to which the command pertains. The processor 1200 then checks whether the mobile device 150 that sent the command is authorized to operate the target controllable device 130. For example, the processor 1200 may utilize any of the above-described methods to determine the authorized subset of controllable devices that the mobile device 150 that sent the command is authorized to operate and then ensure than the target controllable device 130 is a member of the authorized subset. The processor 1200 may also select the target controllable device from one of the media devices in the hotel by choosing one of the controllable devices 130 in the authorized subset. For example, when the command received involves turning up the volume on a TV, the processor 1200 may query the registered room table 1010 to determine the registered room with which the mobile device 150 is associated, and then select the target controllable device being the in-room TV (or STB) in the registered room.

Step 1304: Is the mobile device authorized to operate the target controllable device? When the mobile device that sent the command is authorized to operate the target controllable device determined at step 1302, control proceeds to step 1306; otherwise, when the mobile device that sent the command is not authorized to operate the target controllable device determined at step 1302, control proceeds to step 1316. Taking the above example of the received command involving turning up the volume on the TV, when the mobile device 150 that sent the command is associated with a registered room having a TV (or STB) in table 1010, the mobile device 150 is deemed authorized to operate the TV (or STB) at this step and control proceeds to step 1306. Alternatively, when mobile device 150 is not associated with a registered room, or when the authorized subset of controllable devices for which the mobile device is associated does not include a TV (or STB), the mobile device 150 is deemed not authorized to operate the TV (or STB) at this step and control proceeds to step 1316.

Figure 16:
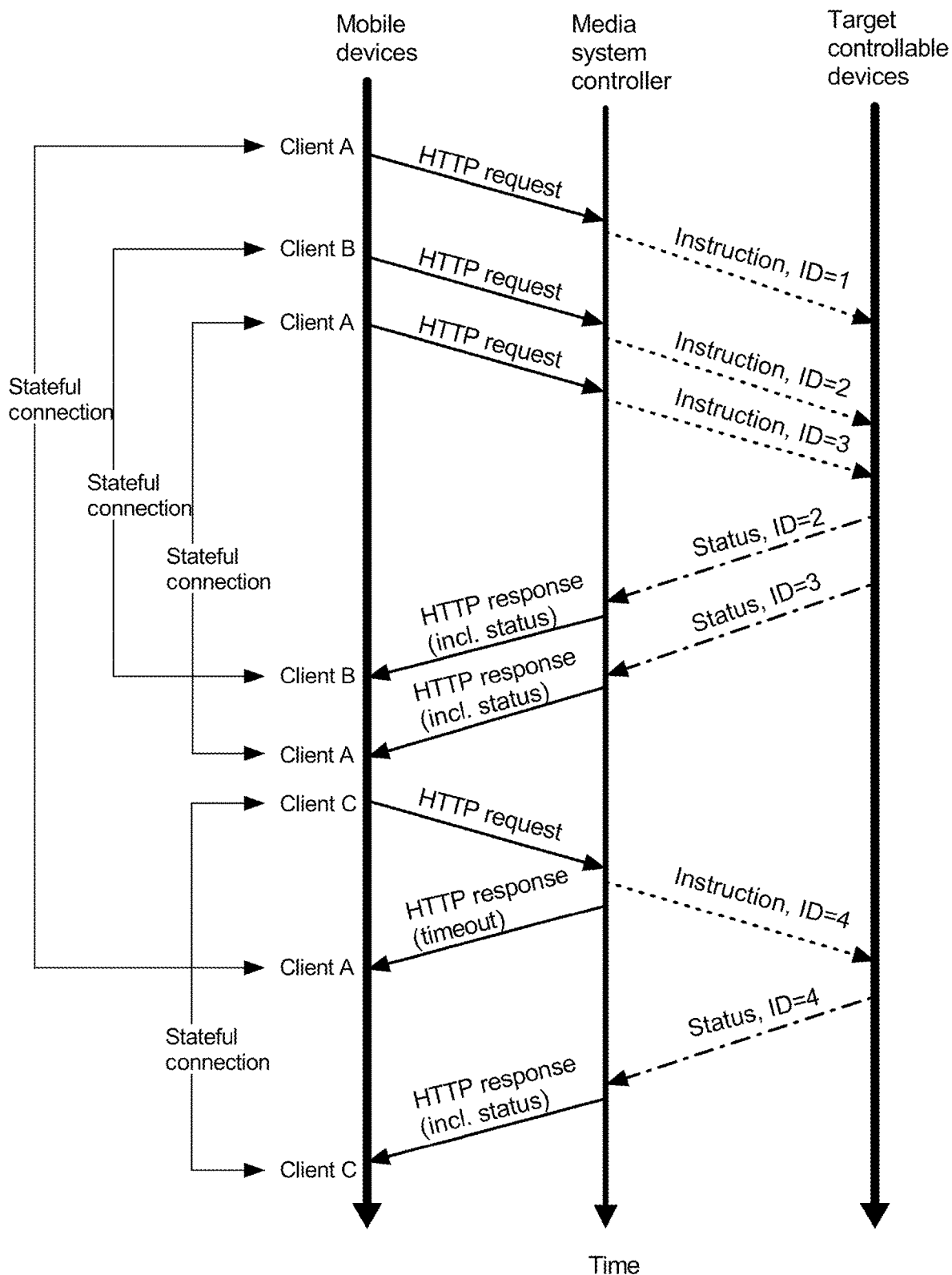
FIG. 16 is a timeline diagram illustrating an example of the media system controller of FIG. 12 allowing each of a plurality of mobile devices to control one or more controllable devices.

Step 1306: The processor 1200 generates a command identifier used to identify the command received at step 1300. In one example, the command identifier is a unique identifier such that each command identifier refers to a different pending command. Pending commands are commands that have been received (e.g., at step 1300) but to which no response has yet been sent (i.e., none of steps 1316, 1318, and 1320 have been reached). There may be several pending commands, received from one or more mobile devices 150, that are awaiting a response from the media system controller 110. As will be explained in more detail with reference to FIG. 17 and FIG. 18, each time a command is received at step 1300, the processor 1200 may create a command process 1204 having a unique process identifier in memory 1204. Each command process 1204 is responsible for handling a single command received at step 1300 and is suspended until a response to the command is to be sent to the originating mobile device 150 (i.e., that sent the command). In one configuration, the command identifier generated at this step may correspond to the unique process identifier created by the processor 1200 when the command process 1204 is created. Other types of command identifiers may also be used in other configurations to identify each command received at step 1300. For example, the processor 1200 may increment a counter for each command received and the value of the counter when a command is received may thereby identify the pending command. This type of incrementing command identifier is illustrated in FIG. 16. Having the command identifiers generated by the media system controller 110 (e.g., by processor 1200) is beneficial to ensure each command is uniquely identified at the media system controller 110 without requiring different mobile devices 150 to be aware of what command identifiers are currently in use by other mobile devices 150. This is particularly advantageous at a hospitality location such as a hotel that may have hundreds of guests operating controllable devices from different mobile devices.

Step 1308: The processor 1200 sends an instruction corresponding to the command and including the command identifier generated at step 1306 to the target controllable device 130. For example, when the command received at step 1300 involves turning up the volume on the TV in the guest's registered room, the instruction sent at this step may be the specific instruction required to cause a "volume up" action to occur and may be sent to the in-room TV (or STB) in the guest's registered room (i.e., the target controllable device). The instruction also includes the command identifier as an additional piece of information such as included within a header field or other area.

Step 1310: After sending the instruction and corresponding command identifier at step 1308, the processor starts monitoring a time duration. For example, in an exemplary configuration, the processor may record the time that the instruction was sent as tracked by timer 1206. In this way, at future times the processor 1200 may determine the time duration by subtracting the current time of timer 1206 with the recorded sent time for each instruction.

Step 1312: Has the system controller 110 received a message from one of the controllable devices 130 that acknowledges the command identifier generated at step 1306? For example, the message may be received on communication interface 1202a, which is coupled to media system network 106, and the communication interface 1202a may pass the received message to the processor 1200. In one configuration the target controllable device 130 determined at step 1302 will acknowledge each command identifier received from the media system controller 110; however, this is not a requirement and in other configurations the target controllable device 130 may acknowledge a range of command identifiers or another controllable device 130 may acknowledge a command identifier on behalf of the target controllable device 130. When a message is received acknowledging the command identifier generated at step 1306, control proceeds to step 1318; otherwise, control proceeds to step 1314.

Step 1314: Has the time duration started at step 1310 exceeded a predetermined threshold? In an example configuration, the predetermined threshold may be on the order of seconds such as ten seconds. In this way, each controllable device 130 is given up to ten seconds to acknowledge the command identifier sent with each instruction. Other thresholds may be selected according to application specific requirements. When the time duration has exceed the predetermined threshold, control proceeds to step 1320; otherwise, control returns to step 1312 to continue waiting for acknowledgement of the command identifier sent at step 1308.

Step 1316: Because the mobile device 150 that sent the command is not authorized to operate the target controllable device 130 determined at step 1302, the processor 1200 responds to the command by returning a response to the mobile device 150 indicating authentication failure.

Step 1318: Because one of the controllable devices 130 has acknowledged the specific command identifier generated at 1306, the processor 1200 responds to the command identified by the command identifier by returning a response to the originating mobile device 150 indicating transaction complete. The response may further include an indication of success or failure, or any other status information included in the acknowledgement message received in the message from the controllable device 130.

Step 1320: Because a message acknowledging the command identifier generated at step 1306 has not been received from any of the controllable devices 130 before the predetermined threshold time duration expires, the processor 1200 responds to the command by returning a response to the originating mobile device 150 indicating timeout.

Concerning terminal steps 1316, 1318, and 1320, the processor 1200 may generate the appropriate response and then pass the response to either communication interface 1202b or communication interface 1202c for transmission to the originating mobile device 150.

Figure 14:
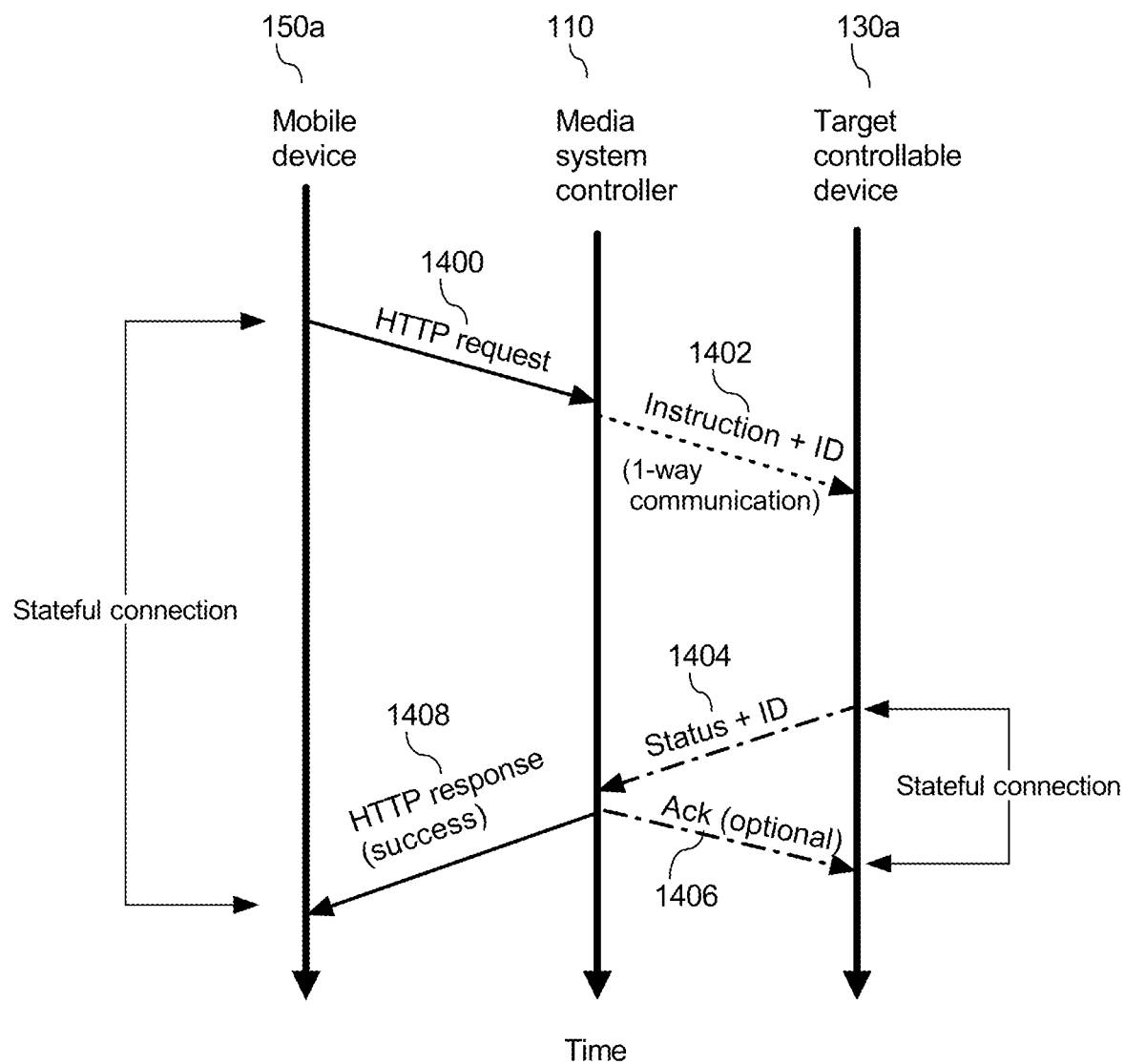
FIG. 14 is a timeline diagram illustrating an example of the media system controller of FIG. 12 completing a command transaction between an originating mobile device and a target controllable device.

FIG. 14 is a timeline diagram illustrating an example of the media system controller 110 of FIG. 12 completing a command transaction between an originating mobile device 150a and a target controllable device 130a. In this configuration, the command received at step 1300 from the mobile device 150a is an hypertext transfer protocol (HTTP) request 1400 received over a stateful (e.g., TCP) connection opened between the originating mobile device 130a and the media system controller 110.

The mobile device 150a sends an HTTP request 1400 to the media system controller 110, for example, over the hotel's guest accessible wireless local area network (WLAN) 108. The media system controller 110 receives the HTTP request 1400 but rather than immediately responding to the HTTP request 1400, the media system controller 110 holds the connection open and generates a command identifier (labeled ID in FIG. 14) that corresponds to the received command (i.e., HTTP request 1400). The media system controller 110 determines from the information of the HTTP request 1400 a target controllable device 130a to which the command pertains. The media system controller 110 then sends an instruction 1402 corresponding to the command and including the generated command identifier ID to the target controllable device 130a.

In one configuration, the instruction 1402 is sent by the media system controller 110 to the target controllable device 130a via a one-way communication that has no guarantee of delivery. Examples of such one-way communications include user datagram packet (UDP), internet protocol (IP) multicast, infrared transmission, and RF transmission. Often controllable devices 130 are designed to accommodate control instructions received via these one-way communications. For example, a STB may allow remote control according to instructions received via UDP and a TV may allow remote control according to instructions received via infrared transmission. Sometimes a single controllable device 130 may allow remote control from multiple communications interfaces such as from both infrared and/or from RF transmission. Additionally, the media system controller 110 may additionally send one-way instructions 1402 to a plurality of devices at the same time using IP multicast. Sending the instruction using a TCP connection may be utilized in another configuration.

The target controllable device 130a executes the instruction 1402 and later sends a status message 1404 including an acknowledgment of the command identifier ID received with the instruction 1402. For example, status message 1404 in this example indicates that the instruction 1402 was performed successfully by the target controllable device because the command identifier (ID) is acknowledged. In this configuration, the target controllable device 130a sends the status message 1402 to the media system controller 110 using another HTTP request 1404 and the media system controller 110 returns an HTTP response 1406 to the target controllable device 130a. However, other methods of sending status message 1404 by the target controllable device to the media system controller 110 to thereby acknowledge the command identifier ID may also be used such as via a one-way communication.

The media system controller 110 utilizes the acknowledged command identifier ID to correlate the status message 1404 with a pending command (i.e., HTTP request 1402 in this example). The media system controller 110 then responds to the pending command (HTTP request 1402 in this example) by returning a corresponding HTTP response 1408 to the originating mobile device 150a. The HTTP response 1408 in this example includes an indication of whether or not the command was successfully performed by the target controllable device 130a and any related status information received in the message 1404 from the target controllable device 130a.

For example, when the HTTP request 1400 involves a "volume up" command, the HTTP response 1408 may indicate that the STB in the guest's registered room was successful in turning up the volume on the attached TV and also include a numerical value of the new volume setting. The indication of success or failure may be represented using different HTTP response codes in a header section of the HTTP response 1408, and the status information may be included as data in a content body of the HTTP response 1408. From the point of view of mobile device 150a, the media system controller 110 directly replies to the original HTTP request 1400 with an HTTP response 1408 including the status of the target controllable device 130a.

Sending commands from mobile devices 150 to the system controller 110 using HTTP requests 1400 is beneficial because most mobile devices include web browsing functionality and therefore no server software is required to be installed on the user's mobile device. For example, whether using a custom application 152 or the default web browser installed on the mobile device, HTTP requests 1400 and responses 1408 are likely to be fully supported and to not violate any security limitations on each mobile device 150. Additionally, when the application program 152 is written as a browser-based application, only a web browser may be required on each mobile device 150.

Figure 15:
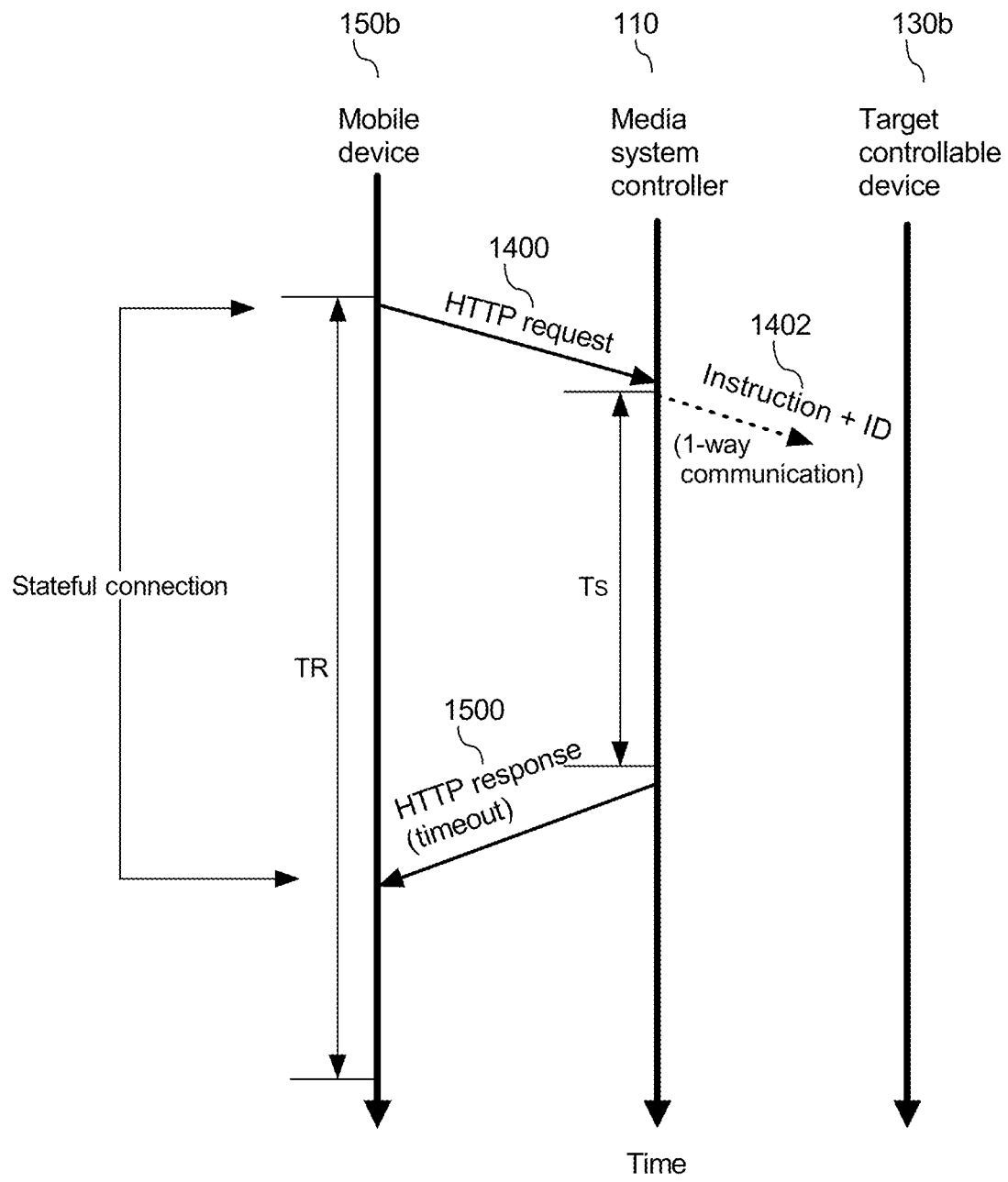
FIG. 15 is a timeline diagram illustrating an example of the media system controller of FIG. 12 sending a hypertext transport protocol (HTTP) response indicating transaction timeout when the target controllable device does not acknowledge a particular command identifier within a predetermined time duration.

FIG. 15 is a timeline diagram illustrating an example of the media system controller 110 of FIG. 12 sending an HTTP response 1500 indicating transaction timeout when a target controllable device 130b does not acknowledge a particular command identifier within a predetermined time duration. Similar to FIG. 14, an originating mobile device 150b sends the HTTP request 1400 over the hotel's guest accessible WLAN 1400, and the media system controller 110 sends the corresponding instruction 1402 including command identifier ID to the target controllable device 130b, for example, over a wired RF coax cable forming part of the media system network 106. However, in this example, the target controllable device 130b does not receive the instruction 1402 from the media system controller 110. For example this could happen in situations when the network 106 fails or the target controllable device 130b is turned off or malfunctions.

To detect such failures, when sending the instruction 1402 to the target controllable device 130b, the media system controller 110 also starts timing a status time duration, for example, using the timer 1206 illustrated in FIG. 12. If the status time duration exceeds a predetermined threshold time duration $T_S$ and no status message acknowledging the command identifier ID has yet been received at the media system controller 110, the media system controller 110 automatically returns an HTTP response 1500 to the mobile device 150b indicating a timeout failure.

Furthermore, to detect failures of either the guest accessible network 106 (which is an unreliable WLAN in this example) or the media system controller 110, when initially sending the HTTP request 1400, the mobile device 150b may automatically start timing a response time duration. If the response time duration exceeds a predetermined threshold $T_R$ without receiving any HTTP response 1500 from the media system controller 110, the mobile device assumes the HTTP request 1402 was not received by the media system controller 110. Generally the $T_R$ time duration threshold will be longer than the $T_S$ time duration threshold to allow the media system controller 110 and target controllable device 130b time to process the command received from the mobile device 150b. For example, the $T_S$ time duration threshold may be defined as five seconds and the $T_R$ time duration threshold may be defined as ten seconds. In this way, target controllable device has up to five seconds ($T_R$) to return a status message 1404 acknowledging the command identifier (ID), and the media system controller 110 has up to ten seconds ($T_S$) to return an HTTP response 1404,1500 to the mobile device 150.

FIG. 16 is a timeline diagram illustrating an example of the media system controller 110 of FIG. 12 allowing each of a plurality of mobile devices 150 to control one or more controllable devices 130. In this example, the media system controller 110 uses respective command identifiers (labeled as different IDs in FIG. 16) to correlate status messages received from multiple controllable devices 150 with their corresponding commands (sent using different HTTP requests). In this way, the media system controller 110 can simultaneously operate the controllable devices 130 in each mobile device's authorized subset in dependence upon commands received from each mobile device. Generating unique command identifiers (e.g., unique IDs) by the media system controller 110 allows multiple stateful connections received from different mobile devices 150 to be synced up with status messages received from different controllable devices 130. A benefit of holding each stateful connection open until sending the HTTP response is that no periodic polling is required by the mobile devices in order to check the status of their commands.

As shown, the media system controller 110 generates unique (consecutive in this example) command identifiers (IDs) that are passed to each respective target controllable device along with an instruction according to the command. Each target controllable device 130 then sends a message to the media system controller 110 acknowledging the particular command identifier and including any related status information. In this way, the media system controller 110 is able to correlate status information received from a controllable device with the appropriate stateful connection to the client and send a corresponding HTTP response. Additionally, an HTTP response is also returned to a mobile device indicating a timeout error if no status message is received acknowledging the corresponding ID number (e.g., no status info for ID=1 is received in this example).

Figure 17:
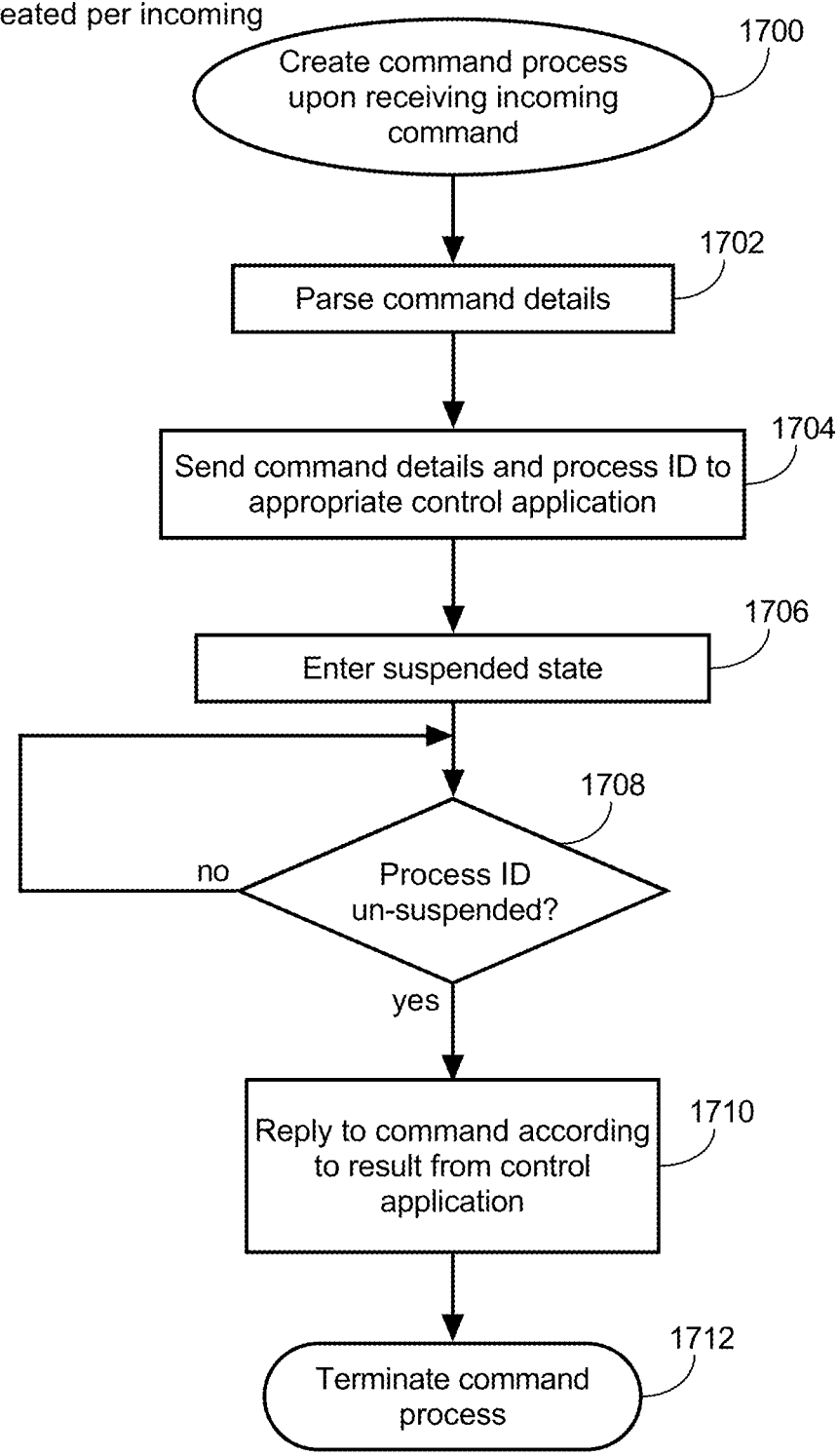
FIG. 17 is a flowchart illustrating operations performed by each command process of FIG. 12 according to an exemplary configuration.

FIG. 17 is a flowchart illustrating operations performed by each command process 1208 of FIG. 12 according to an exemplary configuration. The steps of the flowchart are not restricted to the exact order shown, and, in other configurations, shown steps may be omitted or other intermediate steps added. In this example, each command process 1208 proceeds through the following steps:

Step 1700: A new command process 1208 is created each time the media system controller 110 receives a command (e.g., an HTTP request 1400) from a mobile device 150. Each command process 1208 is also associated with a unique process ID (shown as #1 to #N in FIG. 12), which is generated by the processor 1200 at the time the command process 1208 is created. In one example, the process ID may be a number used by an operating system kernel of the media system controller 110 to (temporarily) uniquely identify each command process 1208. Because a different command process 1208 is created for and handles each newly received command, each process ID also identifies a pending command and may therefore be considered as a command ID.

Step 1702: The command process 1208 parses the command received from the mobile device 150 to determine which control application 1210 is involved in executing the command. For example, when the command is an HTTP request 1400 involving turning up the volume of an in-room TV (or STB), the STB control application 1210*a* may be the appropriate control application. Alternatively, when the command is an HTTP request involving turning up the in-room air conditioning, the room control application 1210*b* may be the appropriate control application.

Step 1704: The command process 1208 sends information of the command (e.g., the content of the HTTP request 1400) and the process identifier to the appropriate control application determined at step 1702.

Step 1706: The command process 1208 enters a suspended state. In one configuration, the suspended state may involve "blocking" the command process 1208 from further execution on the processor 1200 while it is waiting for a result message from the control application determined at step 1702. At this point, the suspended command process 1208 corresponds to a pending command (e.g., HTTP request 1400) for which a response (e.g., HTTP response 1408, 1500) has not yet been sent.

Step 1708: Has the process ID been un-suspended? For example, has a result message been received from the appropriate control application determined at step 1702? If yes, control proceeds to step 1710; otherwise, the control process 1208 remains in the suspended state.

Step 1710: The command process 1208 replies to the pending command according to the result message received from the control application. For example, the command process 1208 returns an HTTP response 1408, 1500 indicating the result from the appropriate control application. In this configuration, the result message may indicate any of authentication failure, command transaction complete, or command timeout. The difference between these result messages are explained further in the description of FIG. 18.

Step 1712: After replying to the command with the result response (e.g., after sending HTTP response 1408, 1500), the command is no longer pending and the command process therefore terminates operation. For example, the command process 1208 may finish and be terminated by the operating system of the media system controller 110.

Figure 18:
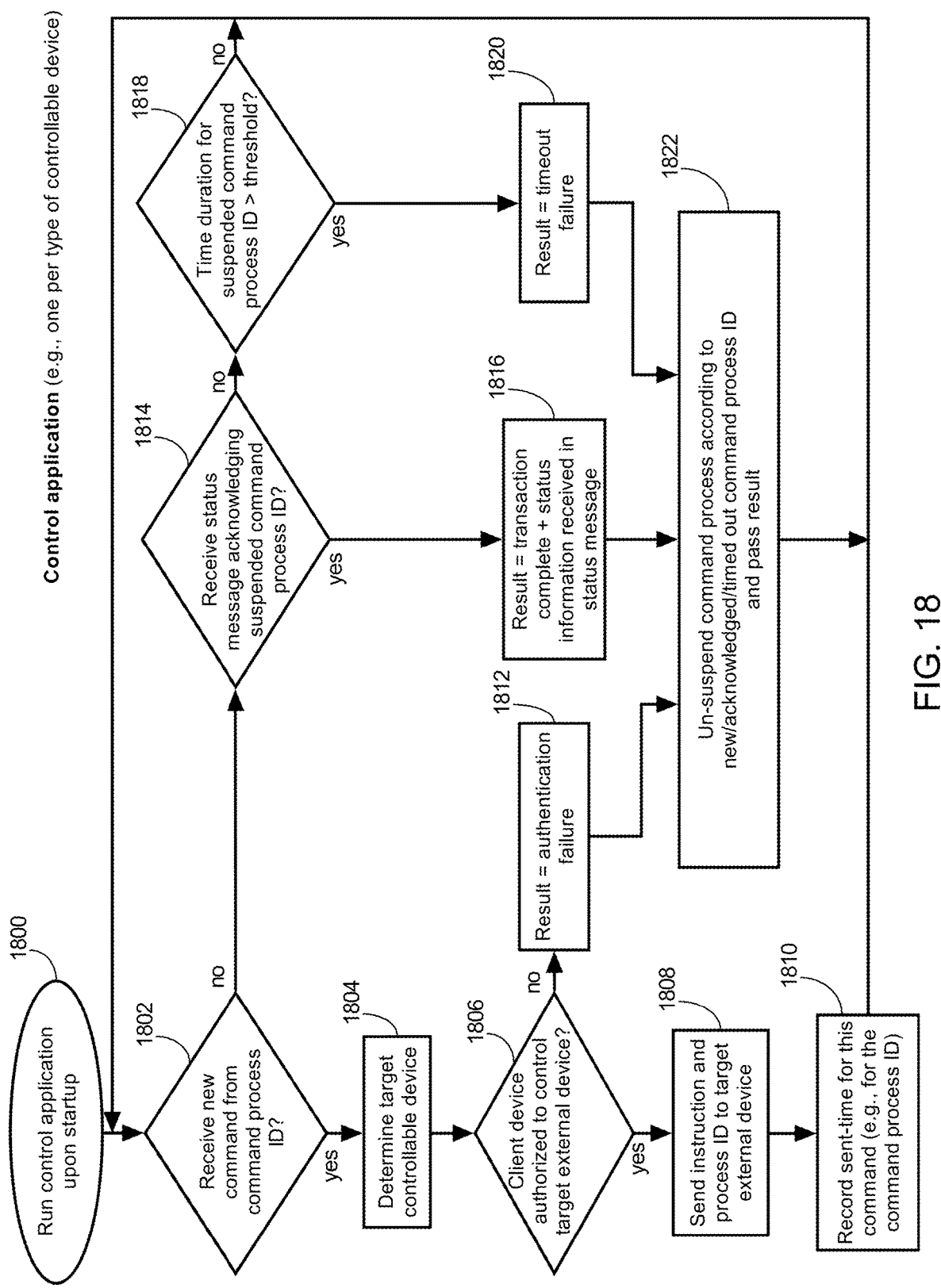
FIG. 18 is a flowchart illustrating operations performed by each control application of FIG. 12 according to an exemplary configuration.

FIG. 18 is a flowchart illustrating operations performed by each control application 1210 of FIG. 12 according to an exemplary configuration. The media system controller 110 may include any number of control applications 1210, each utilized to handle commands and send instructions and other information to/from various controllable devices 130. For example, in this configuration, each control application 1210 is configured to handle operating a specific type of controllable device (e.g., a first control application 1210*a* for operating STBs, and a second control application 1210*b* for operating room control boxes, etc.). The steps of the flowchart are not restricted to the exact order shown, and, in other configurations, shown steps may be omitted or other intermediate steps added. In this example, each control application 1210 proceeds according to the following steps:

Step 1800: The media system controller 110 begins running the control application 1210 upon system startup.

Step 1802: Has the control application 1210 received details of a new command from a command process 1208? For example, a newly created command process having a unique process ID may pass details of a command received from a mobile device 150 to the control application 1210. When the details of a new command are received, control proceeds to step 1804; otherwise, control proceeds to step 1814.

Step 1804: The control application 1210 determines a target controllable device 130 to which the command pertains. For example, the control application 1210 may operate at this step similar to as described for step 1302 in FIG. 13.

Step 1806: Is the mobile device 150 that sent the command authorized to operate the target controllable device 130 determined at step 1804? For example, the control application 1210 may operate at this step similar to as described for step 1304 in FIG. 13. When the mobile device 150 is authorized to operate the target controllable device, control proceeds to step 1810; otherwise, control proceeds to step 1808.

Step 1808: The control application 1210 sends an instruction corresponding to the command and including a command identifier being the process identifier of the command process 1208 from which the command details were received at step 1802.

Step 1810: The control application 1210 records the time that the instruction of step 1808 was sent according to the value of timer 1206.

Step 1812: Because the originating mobile device 150 that sent the command is not authorized to operate the target controllable device 130, the control application 1210 sets the result message to indicate authentication failure and control proceeds to step 1822.

Step 1814: Has the control application 1210 received a status message from one of the controllable devices 130 acknowledging a command identifier corresponding to a pending command? For example, when a status message received from one of the controllable devices 130 acknowledges a currently suspended command process identifier, control proceeds to step 1816; otherwise, control proceeds to step 1818.

Step 1816: Because a controllable device 130 has acknowledged a command identifier for a pending command (e.g., acknowledge command identifier corresponds to a suspended command process identifier), the control application 1210 sets the result message to indicate transaction complete. The result message may also include other status information from the status message received at step 1814.

Step 1818: Has the time duration of a pending command exceeded a predetermined threshold time duration without receiving any acknowledgement of the corresponding command identifier? For example, does the current time minus any of the time values recorded at step 1810 for a pending command exceed the predetermined threshold time duration? If yes, control proceeds to step 1820; otherwise, control returns to step 1802.

Step 1820: Because no message from any of the controllable devices 130 has been received acknowledging the command identifier (i.e., process identifier in this example), the control application 1210 sets the result message for the corresponding command process to indicate timeout failure.

Step 1822: The control application 1210 un-suspends the command process 1208 identified by the command identifier (process ID in this example) and passes the result message for transmission to the originating mobile device 150. For example, when this step is reached via step 1812, the command process identifier from which the details of the new command were received at step 1802 is un-suspended. When this step is reached via step 1816, the command process identifier that was acknowledged in the message received at step 1814 is un-suspended. Likewise, when this step is reached via step 1820, the command process identifier that has not been acknowledged before exceeding the time duration threshold at step 1818 is un-suspended. As previously described, after being un-suspended the command process 1208 returns a response (e.g., an HTTP response) according to the result message to the originating mobile device 150.

Although the above examples have illustrated at least one command process 1208 interacting with at least one control application 1210, in another configuration, there may be a further process (not shown) used to receive status messages from the controllable devices 150 and pass them to the appropriate control application 1210. After receiving the status information, the control application 1210 may then pass the result message to the associated command process 1208, for example, by mapping the command identifier included in the status message with the suspended command process identifier.

Figure 7:
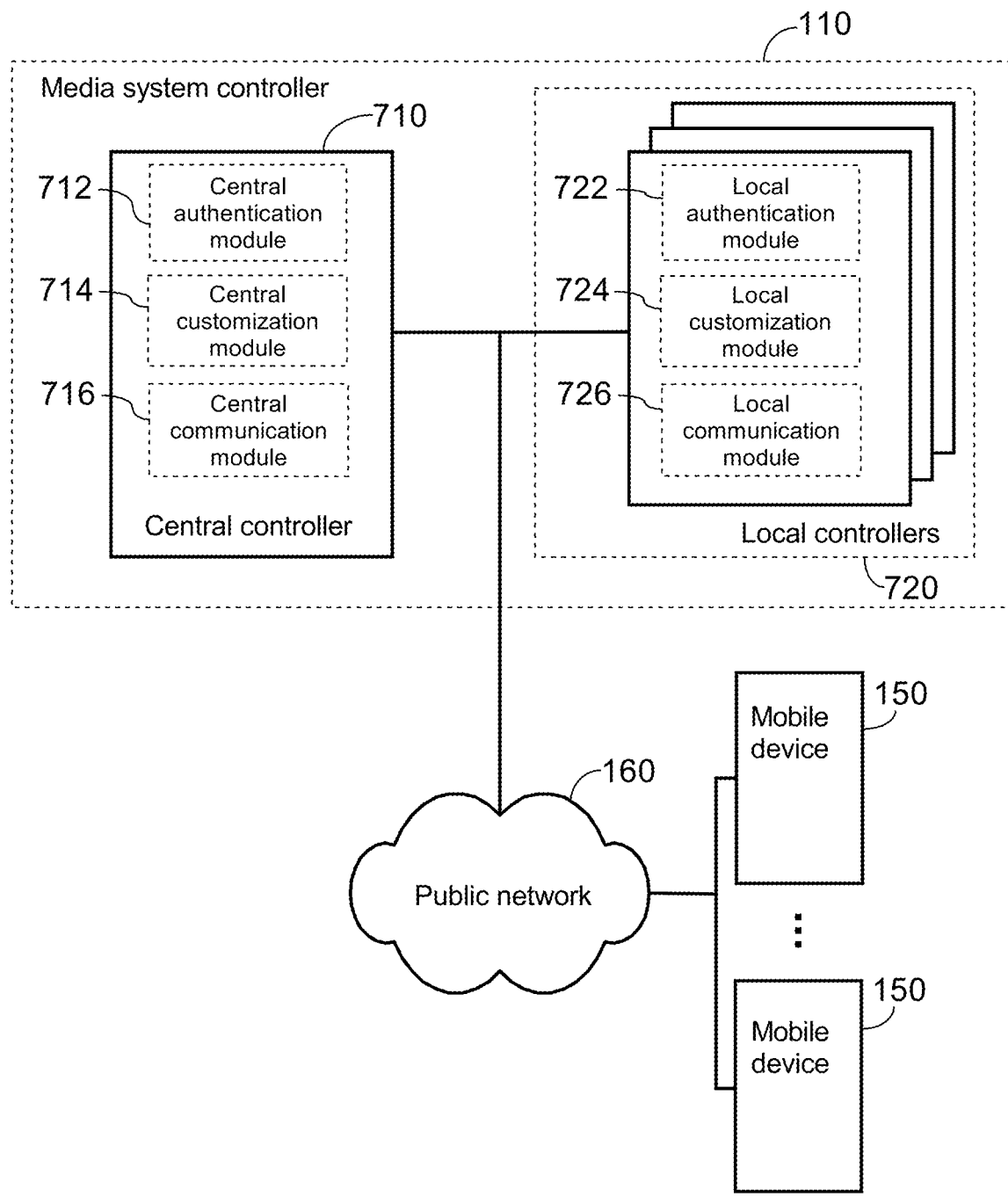
FIG. 7 illustrates the media system controller of FIG. 1 being divided into a central controller and a plurality of local controllers according to another configuration of the invention.

FIG. 7 illustrates the media system controller 110 of FIG. 1 being divided into a central controller 710 and a plurality of local controllers 720 according to another configuration of the invention. In this configuration, the central controller 710 includes a central authentication module 712, a central customization module 714, and a central communication module 716; and each of the local controllers 720 includes a local authentication module 722, a local customization module 724, and a local communication module 726. The central controller 710 may be located at an off-site location such as a media system vendor server room, and each of the local controllers 720 may be located on-site at the various hotels incorporating the media system 100. Communication between the central controller 710 and the local controllers 720 may be via a direct link or may be through the public network 160. Encryption and/or virtual private network (VPN) links may be utilized to ensure secure communication between the central controller 710 and the various local controllers 720.

When a mobile device 150 connects to the media system controller 110 via the public network 160, communication is first established with the central communication module 716. Customization and authentication may be performed by the central controller 710 using the central customization module 714 and the central authentication module 712 according to techniques similar to what was already described above for FIG. 1. In this configuration, information in the database 118 in FIG. 1 may also be located at the central location. Alternately, the modules 712, 714, 716 in the central controller 710 may each operate in tandem with the corresponding modules 722, 724, 726 in the local controller 720 at the hotel for which the mobile device 150 is associated. Information stored at the central controller may include a mapping of each known mobile device 150 to a particular local controller 720. In the event that an unknown mobile device 150 connects to the central controller 710, the central controller 710 may query the mobile device 150 to identify to which hotel it is associated. This allows the central controller 710 to create the mapping to the correct local controller 720 and then the appropriate customization and authentication would occur utilizing the local customization module 724 and the local authentication module 722 at the local controller 720 in that hotel.

Figure 8:
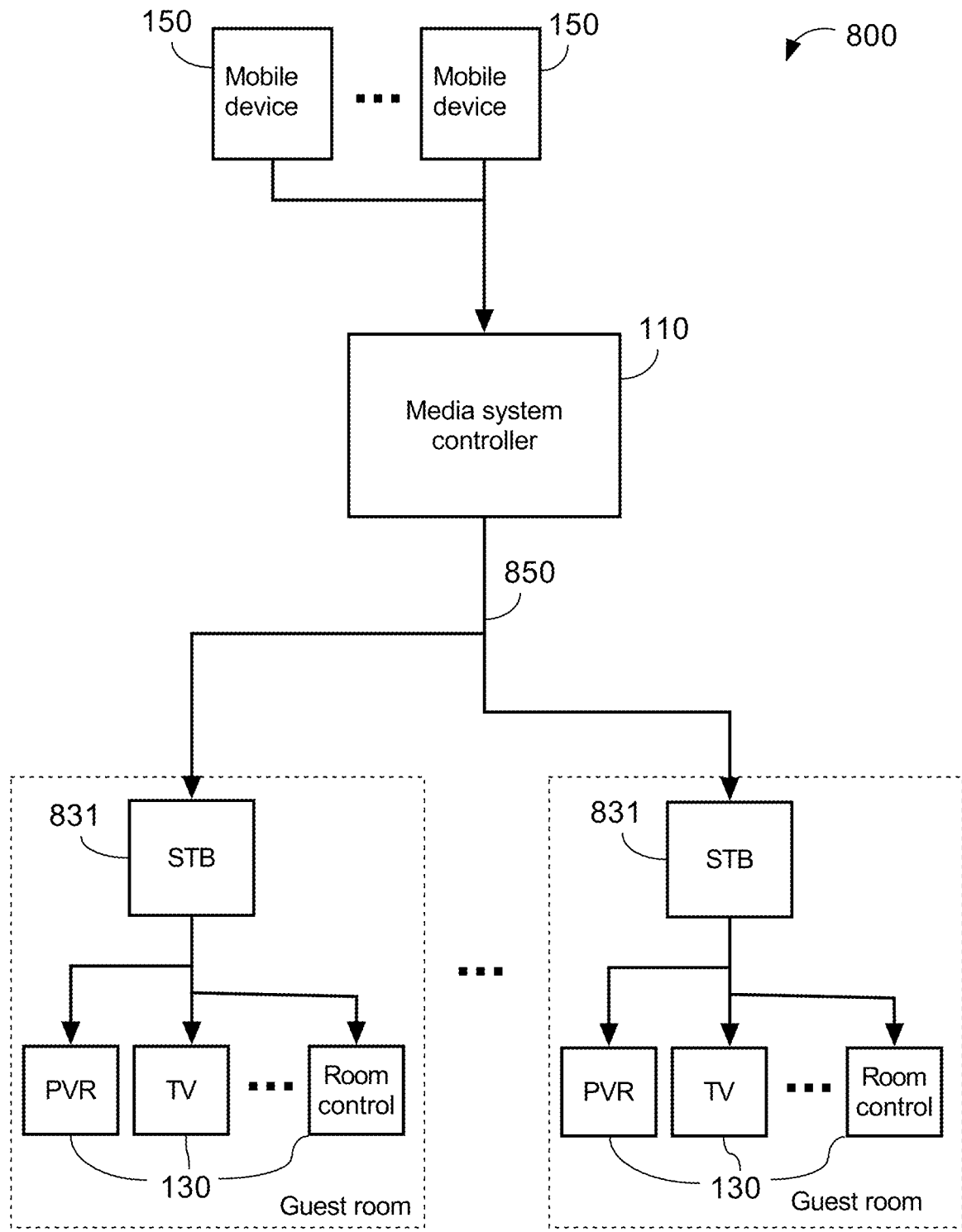
FIG. 8 illustrates how commands received from a mobile device may be passed from the media system controller to a set-top box in a guest room in order to thereby control other controllable devices in the room.

FIG. 8 illustrates how commands received from a mobile device 150 may be passed from the media system controller 110 to a set-top box 831 in a guest room in order to thereby control other controllable devices 130 in the room. In FIG. 8, the arrows on the lines correspond to the direction of controlling commands received from the mobile device 150. In this configuration, the STBs 831 operate as in-room controllers of the other in-room controllable devices 130. The STB 831 also passes back status information from each of the controllable devices 130 to the media system controller 110, which forwards it back to the mobile devices 150. A benefit of this configuration is that an older generation media system may already have an existing network (or other available connections) 850 in the hotel that can be utilized to connect a central location housing the media system controller 110 to all the various in-room STBs 831. In this way, the media system controller 110 may perform the authentication for all the mobile devices 150 and pass commands to in-room STBs. It should also be noted that the functions of STB 831 may also be integrated with one or more of the other controllable devices 130. For example, a television or PVR may include STB functionality embed therein.

Figure 9:
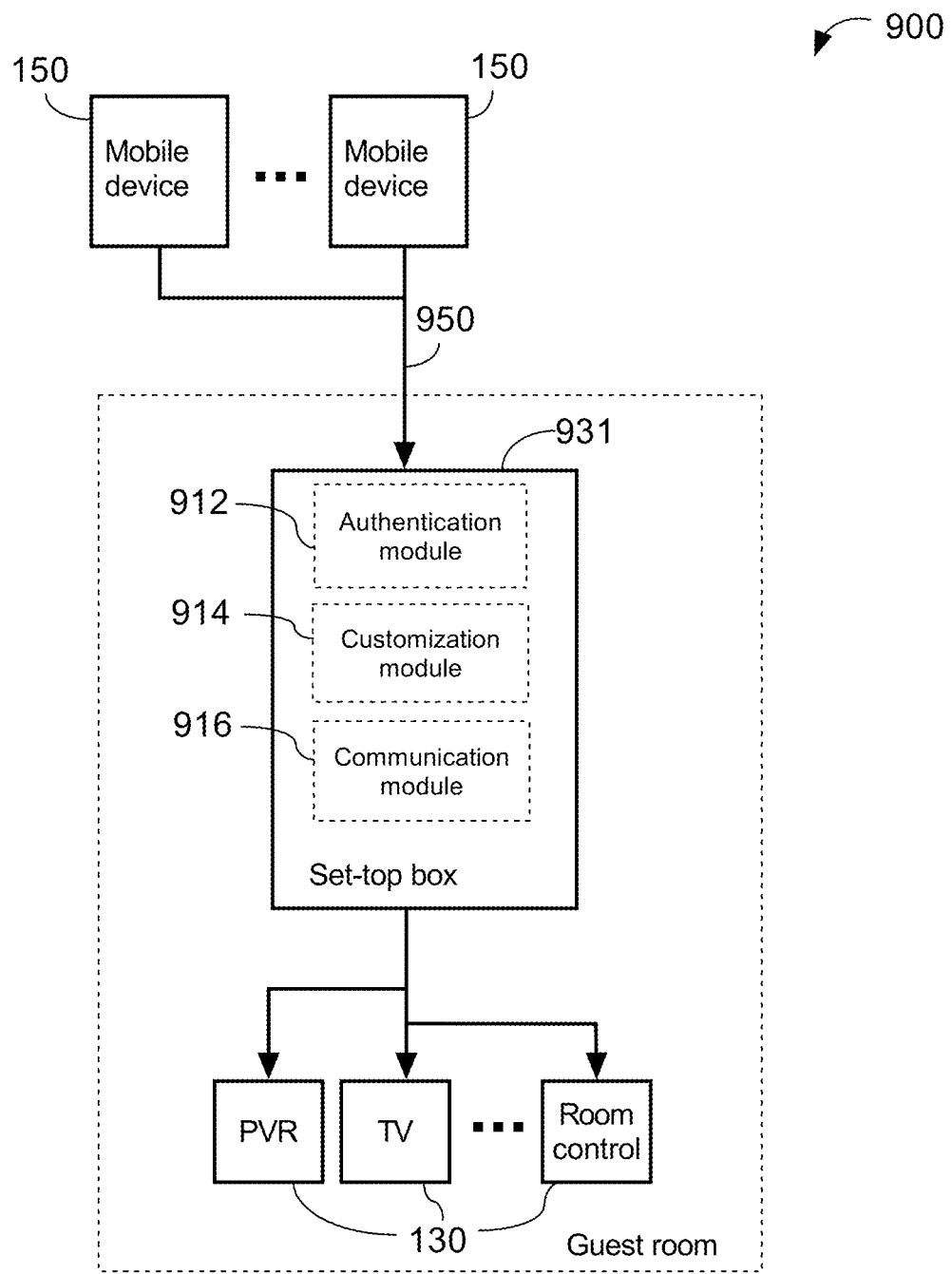
FIG. 9 illustrates how commands from a mobile device may be received directly by an in-room STB in order to control other controllable devices in the room.

FIG. 9 illustrates how commands from a mobile device 150 may be received directly by an in-room STB 931 in order to control other controllable devices 130 in the room. The arrows in FIG. 9 again correspond to the direction of controlling commands received from the mobile device 150. In this configuration, a STB 931 in a guest room includes an authentication module 912, customization module 914, and a communication module 916. The communication module 916 in the STB 931 may support any number of data modes including ports for a direct wired connection such as USB, Ethernet, or Firewire; a wireless connection such as Wi-Fi or Bluetooth, or any other type of connection. Mobile devices 150 connect to the STB 931 via a data connection 950 which could be either a networked, direct, or indirect connection according to the modes supported by the communication module 916. Once connected the customization module 914 and authentication module 912 operate similar to as described above for FIG. 1 to perform customization and authentication functions. In some configurations, the STB 931 may communicate to a media system controller 110 (see FIG. 1) to support the customization and authentication functions. In other configurations, the STB 931 may perform these functions itself. For example, authentication may be performed via a passkey that is generated and displayed on a TV 130 by the STB 931. The mobile device 150 then transmits the same passkey back to the STB 931 to thereby prove its operator is authorized to operate all the in-room controllable devices 130, 931. In this way, in-room authentication may be performed without requiring assistance from the media system controller 110. Customization information may be pre-stored in the STB 931, and may also be determined automatically by the STB 931 according to which other controllable devices 130 are coupled to the STB 931. In this way, a plurality of authentication modules 912, customization modules 914, and communication modules 916 may be distributed in the STBs 931 of the various guest rooms in the hotel.

According to the invention, guests may operate the hotel's media system from the guest's own mobile device. In doing so, there are several benefits:

Familiar Hardware Platform and User Interface

Guests often bring their own laptops, mobile phones, tablet computers, music players and other mobile devices with them as they travel. Such guests are typically also very familiar and comfortable with the user interface and operation of their own devices, and since they carry the equipment with them, there are no new hardware systems to learn as they stay in different hotels.

One Mobile/Web Application for Multiple Hotels

A media system control application 152 for controlling the hotel media systems 100 may be provided for users to install on the mobile platform 150 of their choice. The application 152 may appear and operate the same at all hotels. Alternatively, different hotels or chains may vary certain elements of the application related to branding such as logos and color schemes, or enable additional features and functions. Because one mobile application 152 may be used to control multiple hotels, basic functionality may be substantially the same or at least very similar at multiple hotels. This allows the user to reuse their already-learned knowledge to operate different media systems 100 at different hotels. Similarly, a consistent web interface may be provided across hotels.

Additionally, the mobile application and web interface may also provide device-specific Help information to the guest. Having 1-click Help functionality built into the mobile or web app ensures users always have a quick resource available to answer their "how does this device work?" or "how do I use this?" questions. For example, the media system 100 may include a general overview of how a PVR system works that would be available at any time, as well as a PVR-specific help button available on the IPG page that would lead the guest through the specific steps to record and watch TV shows on a particular system.

Guest can Operate In-Room Controllable Devices Even when not in Room

Because most users' mobile devices 150 include some kind of wireless or wired communication technology, once authorized by a hotel's media system 100, there is nothing stopping the guest from operating the media system 100 even when the guest is outside of their registered room. That is, no matter where the guest is physically located, as long as some kind of a connection to the hotel media system 100 is available, the guest may control in-room and other hotel equipment 130 from their mobile device 150. One example is, while eating dinner in the hotel's restaurant, the guest may view the IPG for the television in the guest's room and choose programs to record for later viewing when they are finished eating. The recording could take place on a PVR installed within the guest's room, or may be done at a network-PVR installed anywhere in the hotel's media system 100. Recorded programs may then be viewed later in the guest's room or even via the mobile device itself if bandwidth and multimedia capabilities of the network and mobile device are sufficient. Any menus or other control elements for devices of the hotel media system 100 in the guest's room may also be controlled from the guest's mobile device. Examples include in-room STB, PVR, television, audio system, room lights, AC/heater, etc. In-room controllable devices also include devices that are physically installed at other locations in the hotel but are controllable from within the guest's registered room such as the network PVR 130 of FIG. 1.

Multiple Authorized Devices and Controllers

There can be more than one authorized mobile device 150 that is allowed to control a single controllable device 130. For example, a conference or meeting room 104 will often have multiple "guests" and the hotel media system 100 may allow more than one person to control something in the room. One mobile device 150 may be able to do everything, one may only do the audio, one may only do the lights, etc. In other words, there can be more than one authorized user per controllable device at a time. Another example would be a Hotel staff member or Support Agent authorizing a device in order to assist a customer/guest if necessary. Once the state of a particular controllable device 130 changes, updated status information will be sent to all mobile devices authorized to operate that controllable device.

In another configuration, the invention may be utilized to interface with other hotel functions that are not a part of the entertainment system. For example, with reference to FIG. 1, the hotel media system 100 may also be for allowing a guest to perform check-in and check-out functions from their mobile device 150. In this configuration, the media system controller 110 may update the information in the database 118 when the guest either checks in or checks out from their mobile device. The database 118 may be a part of the hotel's PMS and therefore the guest's mobile device 150 is in effect operating the PMS. The hotel's PMS may also be utilized by the authentication module 112 for determining the authorized subset of the controllable devices for which a mobile device is authorized to control. In general, the mobile devices 150 may be authorized by the media system controller 110 to operate any type of controllable device 130. User authentication may play a role on what operations are available for particular controllable devices 130.

Another benefit is either a media system vendor or a particular hotel can push automatic updates to the guest using the mobile application. For example, the hotel could push out ads or information about upcoming sales, etc. This could be as either a content update of the app, or even a new software version that would automatically trigger the mobile device to inform the user that an update is available. Messages and announcements may also be transferred to user's mobile devices.

A further advantage is the hospitality media system may automatically authorize a user to use a mobile device to control the in-room devices in the room(s) for which the user is currently registered. When the room is no longer registered to the user, the media system may automatically de-authorize the user from controlling in-room devices. The process may then repeat with each future guest staying in the room. This is highly beneficial for hospitality locations such as hotels that may have thousands of rooms including guest rooms, meeting rooms, and conference rooms, and continuously arriving and departing guests, each of who may bring one or more mobile devices they wish to use to operate in-room controllable devices during their stay at the hotel.

In one configuration, the media system controller 110 does not immediately respond to a command received from a mobile device 150, and instead generates a unique command identifier for identifying the command and forwards an instruction plus the command identifier to a target controllable device 130 which the mobile device is authorized to operate. Then, when the media system controller 110 receives new status information acknowledging the command identifier in a subsequent message received from one of the controllable devices 130, the media system controller 110 replies to the pending command by returning a response indicating transaction complete to the mobile device 150 that sent the pending command as identified by the acknowledged command identifier.

Receiving a transaction complete message at the originating mobile device 150 is useful when a user of the mobile device 150 is unable to manually confirm that the command was successful performed. When the user is in the same room as the target controllable device 130, the lack of feedback on a display of the mobile device 150 regarding the status of the command may not be a problem because the user may be able to manually perceive that the command was successful. For example, when the command involves turning up the TV volume, the user may hear the TV volume increase and thereby manually confirm the command was successfully performed. However, receiving a response indicating transaction complete and possibly additional status information included in the response at the mobile device 150 is useful in many situations. Examples of such situations include when the user is not in the same room as the target controllable device 130, when sending a complicated command for which the user cannot easily confirm success, and when the command involves a request for information from the target controllable device 130.

Because the media system controller 110 determines whether the mobile device 150 that sent the command is authorized to operate the target controllable device 130 to which the command pertains, and only sends the instruction to the target controllable device 130 when the mobile device 150 is authorized to operate the target controllable device 130, security and privacy of different users is ensured. For example, again using the context of a hospitality location such as a hotel, an originating mobile device 150 may send a generic command to increase the TV volume without actually specifying on which TV the volume change is to occur. The media system controller 110 then selects the target controllable device 130 being the TV in the authorized subset of the controllable devices 130 for which the originating mobile device 150 is authorized to operate. When the authorized subset includes only the in-room controllable devices in the guest's registered room, the media controller 110 will thereby send a volume up instruction to the TV (or STB) in the guest's registered room. There is no need for the guest or the guest's mobile device to be aware that the hotel actually includes more than one TV or to select between different guest rooms in order to specify the target TV. This simplifies both operation and design of the mobile device 150 and security of the overall hotel media system 100.

Reliability of remote operation of the controllable device 130 is also increased because the originating mobile device 150 is made aware of the success/failure of commands. If a command fails (or times out), the mobile device 150 may automatically retry the command. Additionally, because the mobile device 150 is aware of the state of target controllable device 130, enhanced features may be implemented at the mobile device 150. These features may include displaying real time content and/or advertisements associated with a state of a controllable device 130. For example, in the context of a hospitality location such as a hotel, while watching a particular movie on an in-room television, a guest's laptop computer may display other movies by the same actor(s) that are currently available for playback. The guest may then select one of the other movies on the laptop to thereby cause the in-room STB to begin playing a new movie by their selected actor.

Other advantages may be achieved over polling and pushing techniques by waiting to respond to a pending command until an acknowledgment of a command identifier associated with the pending command is received from one of the controllable devices 130.

When using polling techniques, after sending a command to the media system controller 110, a mobile device 150 may periodically poll the media system controller 110 according to a polling period to check whether the controller 110 has received an acknowledgement of the command from the target controllable device 130. To avoid unnecessary user delays, it is desirable that the polling period be as short as possible; however, if the polling period is too short, a race condition is created in that the mobile device 150 may poll the media system controller 110 one or more times before the target controllable device 130 acknowledgement has been received by the media system controller 110. Repeated polling increases load on the media system controller 110 and the network, and may contribute to overload of these components when the system controller 110 and/or network handles multiple mobile devices 150 (e.g., other users' personal computing devices) and multiple controllable devices 130 (e.g., STBs, TVs, room control devices, and other media devices located in guest rooms of a hotel).

However, as shown in each of the timeline diagrams of FIG. 14 to FIG. 16, for each command (e.g., HTTP request 1400) sent by a mobile device 150, a single response (e.g., HTTP responses 1408, 1500) is returned by the media system controller 110. No periodic polling is required by the mobile device 150 in order to obtain the result of the command. For example, the result may include that the mobile device 150 is not authorized to operate the target controllable device, that the command was successful or unsuccessful at the target mobile device, any specific status information from the target mobile device, and/or that the media system controller 110 timed out while waiting for an acknowledgement of the command from the target controllable device 130.

As a single request-response transaction is all that is required between the mobile device 150 and the media system controller 110 for each command, the above-described race condition is alleviated and there is no need for the mobile device 150 to keep polling the media system controller 110 to see if command was successful. Mobile device 150 operation is thereby simplified, and network traffic and media system controller 110 load are thereby reduced.

When using pushing techniques, the media system controller 110 may push a status update to an appropriate mobile device 150 after it is received from the target controllable device 130. However, pushing status updates significantly complicates the design of both the mobile device 150 and the system controller 110 because each must operate as a client and a server. Additionally, to receive such asynchronous status updates from a media system controller 110, the mobile device 150 may need to be configured to open one or more ports and/or authenticate the media system controller 110 before being able to accept the update. Such requirements may be beyond the skills of average guests staying in the hotel and may violate security constraints or lockdowns on corporate mobile devices of business travelers, for example.

When the commands from the mobile device and the associated response from the media system controller 110 are implemented using HTTP requests 1400 and responses 1408, 1500, no new network protocol software is required at the mobile device 150. This configuration of the invention is therefore compatible with all existing mobile devices 150 already supporting web based (HTTP) transactions. Additionally, because the mobile device 150 will have originated the request and therefore opened a transport carrier protocol (TCP) connection with the media system controller 110 in order to send the HTTP request, the media system controller 110 can hold this connection in an open state until after returning the HTTP response, which may occur when receiving an acknowledgement of the pending command from one of the controllable devices or after exceeding a timeout duration without receiving an acknowledgement of the pending command. In this way, no special server ports need to be opened on the mobile devices 150 in order to receive status information.

The media system controller 110 may close the connection immediately after sending the HTTP response such as when each command is sent using a new connection, or after returning several HTTP responses such as when several commands were received in sequence using a same connection. By using standard HTTP, a web browser running on the user's mobile device 150 allows a user to operate one or more controllable devices through the media system controller 110. No specialized server software or security adjustments need be made to the user's mobile device. The custom application 152 may in fact be run as a program within the web browser while still obtaining all the above-described advantages or the web browser itself may be used without any control application 152.

A further advantage is there is no need for the mobile devices and the controllable devices to have compatible communication hardware (or software) in order to achieve above benefits. The media system controller 110 may translate commands received from the mobile devices 150 into corresponding instructions compatible with the controllable devices 130 and vice versa. In this way, the mobile device 150 need not be programmed with specific commands for controlling actual controllable devices 130. Instead, the mobile device 150 may send generic command requests such as selections and submissions of web pages to the media system controller 110, and the media system controller 110 translates the generic commands to specific instructions according to the actual target controllable device 130. In this way, a user's mobile device 150 may be used to control in-room media devices 130 across hotels having equipment provided by different manufactures, for example, different types of STBs requiring their own proprietary instructions.

It should also be mentioned that although HTTP has specific advantages as described above, the invention is also applicable to other types of request-response protocols other than HTTP. Any request-response type protocol may be used by the mobile device 150 to send a command message to the media system controller 110 and later receive a response via the media system controller 110 indicating the result of the command such as new status of the specific target controllable device 130 for which the mobile device 150 is authorized to control.

In an exemplary embodiment, a system controller for operating one or more controllable devices in dependence upon commands received from a mobile device includes a first communication interface for receiving a command from the mobile device and a second communication interface for receiving a message from a controllable device. One or more processors are configured to determine whether the mobile device that sent the command is authorized to operate a target controllable device to which the command pertains, and generate a command identifier for identifying the command, and send an instruction corresponding to the command and including the command identifier to the target controllable device when the mobile device is authorized to operate the target controllable device. The system controller replies to a pending command identified by a particular command identifier with a response indicating transaction complete when the message from the controllable device acknowledges the particular command identifier.

In an exemplary embodiment, a plurality of controllable devices is in communication with and remotely operable by a media system controller. A storage device stores associations between respective passkeys and one or more of the controllable devices that are currently associated therewith. The controller generates a passkey in response to an occurrence of a first event associated with a particular one of the controllable devices, stores in the storage device an association between the passkey and the particular one of the controllable devices, and the passkey is displayed by the particular one of the controllable devices. The passkey is entered into a mobile device by a user. The controller receives the passkey from the mobile device, finds the particular one of the controllable devices currently associated with the passkey, and transfers commands and status information between the particular one of the controllable devices and the mobile device until an occurrence of a second event.

In the above description, the exemplary user indication of "guest" refers to current guests in the hotel, people who are attending a conference or meeting in the hotel, staff members at the hotel, or any other user who may need or want to operate a hospitality media system. Future guests that have reservations, potential future guests that don't yet have reservations, and other users may also be given access for certain in-room functions. For example, a demonstration of the technology may be available in the hotel lobby and all users would be able to utilize their own mobile devices 150 to operate controllable devices 130 installed in the lobby in order to try out the system 100. Additionally, it is not necessary that the users bring their own mobile device 150. In another configuration, the mobile device 150 may be provided to the user by the hotel. It should also be noted that the term "mobile" is utilized to mean the device is capable of being moved. Although portable devices that are easily carried are anticipated by the inventors as being particularly useful, it is not a strict requirement that the mobile devices be easily carried. Other devices such as desktop computers that are of a more permanent nature may also act as mobile devices in conjunction with the invention.

Although the invention has been described in connection with a preferred embodiment, it should be understood that various modifications, additions and alterations may be made to the invention by one skilled in the art without departing from the spirit and scope of the invention as defined in the appended claims. For example, although the invention has been described as being utilized at a hotel, the invention is equally applicable to any hospitality related location or service wishing to provide users with a media system including but not limited to hotels, motels, resorts, hospitals, apartment/townhouse complexes, restaurants, retirement centers, cruise ships, busses, airlines, shopping centers, passenger trains, etc. The invention may also be utilized to control other systems and services outside a hotel's media system. For example, hotel's PMS, reporting, or administration systems. The invention is also applicable to operating controllable devices outside the hospitality industry.

The various separate elements, features, and modules of the invention described above may be integrated or combined into single units. Similarly, functions of single elements, features, and modules may be separated into multiple units. The modules may be implemented as dedicated hardware modules, and the modules may also be implemented as one or more software programs executed by a general or specific purpose processor to cause the processor to operate pursuant to the software program to perform the above-described module functions. For example, the media system controller 110 of FIG. 1 may be implemented by a computer server having one or more processors executing a computer program loaded from a storage media (not shown) to perform the functions of the authentication module 110, communication module 116, and/or the customization module 114. In addition to a dedicated physical computing device, the word "server" may also mean a service daemon on a single computer, virtual computer, or shared physical computer, for example. Unless otherwise specified, features described may be implemented in hardware or software according to different design requirements. Additionally, all combinations and permutations of the above described features and configurations may be utilized in conjunction with the invention.

What is claimed is:

1. A controller of a hospitality media system, the controller comprising:
   one or more communication interfaces coupled to a plurality of controllable devices;
   one or more storage devices; and
   one or more processors coupled to the one or more communication interfaces and the one or more storage devices;
   wherein, by the one or more processors executing a plurality of software instructions loaded from the one or more storage devices, the one or more processors are configured to:
      receive information from a mobile device operated by a guest of the hospitality establishment via a computer network;
      query a database to lookup a registered guest room according to the information received from the mobile device;
      define an authorized subset of the controllable devices according to the registered guest room, the authorized subset being one or more of the controllable devices associated with the registered guest room that the mobile device is authorized to operate;
      determine a list of media content including only content that is available in the registered guest room, wherein at least two different guest rooms of the hospitality establishment have a different sets of content available therein;
      transfer the list of media content to the mobile device via the computer network; and
      pass one or more commands received from the mobile device to one or more of the authorized subset of the controllable devices thereby allowing the mobile device to initiate one or more media functions on the one or more of the authorized subset of the controllable devices utilizing first content selected from the list of media content until an occurrence of a de-authorization event.

2. The controller of claim 1, wherein the information received from the mobile device is a passkey that was displayed on a display device within the registered guest room.

3. The controller of claim 1, wherein the one or more processors are further configured to:
   after defining the authorized subset, store an association of the authorized subset with the mobile device in the one or more storage devices; and
   remove from the one or more storage devices the association between the authorized subset and the mobile device in response to the occurrence of the de-authorization event.

4. The controller of claim 1, wherein the de-authorization event corresponds to the guest checking out of the registered guest room.

5. The controller of claim 1, wherein the one or more processors are further configured to transfer a user interface menu to the mobile device for allowing the mobile device to control the authorized subset of the controllable devices.

6. The controller of claim 1, wherein the one or more media functions include personal digital recorder (PVR) functionality to record selected content from the list of media content.

7. The controller of claim 1, wherein the one or more media functions include playback functionality to play selected content from the list of media content on a playback device.

8. A hospitality media system comprising:
   a plurality of controllable devices; and
   a controller coupled to the controllable devices;
   wherein, by one or more processors of the controller executing a plurality of software instructions loaded from the one or more storage devices, the controller is configured to:
      receive information from a mobile device operated by a guest of the hospitality establishment via a computer network;
      query a database to lookup a registered guest room according to the information received from the mobile device;
      define an authorized subset of the controllable devices according to the registered guest room, the authorized subset being one or more of the controllable devices associated with the registered guest room that the mobile device is authorized to operate;
      determine a list of media content including only content that is available in the registered guest room, wherein at least two different guest rooms of the hospitality establishment have a different sets of content available therein;
      transfer the list of media content to the mobile device via the computer network; and
      pass one or more commands received from the mobile device to one or more of the authorized subset of the controllable devices thereby allowing the mobile device to initiate one or more media functions on the one or more of the authorized subset of the controllable devices utilizing first content selected from the list of media content until an occurrence of a de-authorization event.

9. The hospitality media system of claim 8, wherein the information received from the mobile device is a passkey that was displayed on a display device within the registered guest room.

10. The hospitality media system of claim 8, wherein the controller is further configured to:
    after defining the authorized subset, store an association of the authorized subset with the mobile device in a storage device; and
    remove from the storage device the association between the authorized subset and the mobile device in response to the occurrence of the de-authorization event.

11. The hospitality media system of claim 8, wherein the de-authorization event corresponds to the guest checking out of the registered guest room.

12. The hospitality media system of claim 8, wherein the controller is further configured to transfer a user interface menu to the mobile device for allowing the mobile device to control the authorized subset of the controllable devices.

13. The hospitality media system of claim 8, wherein the one or more media functions include personal digital recorder (PVR) functionality to record selected content from the list of media content.

14. The hospitality media system of claim 8, wherein the one or more media functions include playback functionality to play selected content from the list of media content on a playback device.

15. A method of providing remote control of a plurality of controllable devices in a hospitality establishment, the method comprising:
    receiving information from a mobile device operated by a guest of the hospitality establishment via a computer network;
    querying a database to lookup a registered guest room according to the information received from the mobile device;
    defining an authorized subset of the controllable devices according to the registered guest room, the authorized subset being one or more of the controllable devices associated with the registered guest room that the mobile device is authorized to operate;
    determining a list of media content including only content that is available in the registered guest room, wherein at least two different guest rooms of the hospitality establishment have a different sets of content available therein;
    transferring the list of media content to the mobile device via the computer network; and
    passing one or more commands received from the mobile device to one or more of the authorized subset of the controllable devices thereby allowing the mobile device to initiate one or more media functions on the one or more of the authorized subset of the controllable devices utilizing first content selected from the list of media content until an occurrence of a de-authorization event.

16. The method of claim 15, wherein the information received from the mobile device is a passkey that was displayed on a display device within the registered guest room.

17. The method of claim 15, further comprising:
    after defining the authorized subset, storing an association of the authorized subset with the mobile device in a storage device; and
    removing from the storage device the association between the authorized subset and the mobile device in response to the occurrence of the de-authorization event.

18. The method of claim 15, wherein the de-authorization event corresponds to the guest checking out of the registered guest room.

19. The method of claim 15, further comprising transferring a user interface menu to the mobile device for allowing the mobile device to control the authorized subset of the controllable devices.

20. The method of claim 15, wherein the one or more media functions include personal digital recorder (PVR) functionality to record selected content from the list of media content.

* * * * *